United States Patent
Sano et al.

(10) Patent No.: US 11,612,832 B2
(45) Date of Patent: *Mar. 28, 2023

(54) EXTRACTING APPARATUS, AND EXTRACTING-UNIT MANUFACTURING METHOD

(71) Applicant: Hitachi, Ltd., Tokyo (JP)

(72) Inventors: Tadashi Sano, Tokyo (JP); Sachio Sekiya, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 245 days.

This patent is subject to a terminal disclaimer.

(21) Appl. No.: 17/043,907

(22) PCT Filed: Mar. 7, 2019

(86) PCT No.: PCT/JP2019/009182
§ 371 (c)(1),
(2) Date: Sep. 30, 2020

(87) PCT Pub. No.: WO2019/230104
PCT Pub. Date: Dec. 5, 2019

(65) Prior Publication Data
US 2021/0016203 A1 Jan. 21, 2021

(30) Foreign Application Priority Data
May 31, 2018 (JP) .............................. JP2018-104325

(51) Int. Cl.
*B01D 11/04* (2006.01)
*B01D 11/00* (2006.01)

(52) U.S. Cl.
CPC ...... *B01D 11/0407* (2013.01); *B01D 11/0492* (2013.01); *B01D 2011/007* (2013.01)

(58) Field of Classification Search
CPC ............ B01D 11/0407; B01D 11/0492; B01D 2011/007; B01D 11/0207; B01D 11/0292;
(Continued)

(56) References Cited

U.S. PATENT DOCUMENTS 2,152,666 A * 4/1939 Rosenthal ............. C11B 7/0008
202/168
4,061,566 A * 12/1977 Modell .................... B01J 20/20
210/186
(Continued)

FOREIGN PATENT DOCUMENTS

JP     52-126678 A    10/1977
JP   2000-262806 A    9/2000
(Continued)

OTHER PUBLICATIONS

International Search Report (PCT/ISA/210) issued in PCT Application No. PCT/JP2019/009182 dated Jun. 4, 2019 with English translation (five pages).
(Continued)

*Primary Examiner* — Joseph W Drodge
(74) *Attorney, Agent, or Firm* — Crowell & Moring LLP

(57) ABSTRACT

An extracting apparatus includes: a first phase transition section that causes a phase transition of an extraction solvent from a gas to a liquid; a second phase transition section that causes a phase transition of the extraction solvent from a liquid to a gas; a treatment tank that stores a treated material, and receives an inflow of the extraction solvent that has been liquefied in the first phase transition section; a first valve that is provided between the second phase transition section and the treatment tank; and a second valve that is provided between the first phase transition section and the treatment tank. The second phase transition section is connected with a recovery valve.

10 Claims, 35 Drawing Sheets

Symbol Legends for FIG. 5 and subsequent drawings:

(58) Field of Classification Search
CPC ............ B01D 11/0203; B01D 11/0488; B01D 1/0047; B01D 11/028; B01D 11/0288; B01D 5/006; B01D 3/007; B01D 1/02; B01D 11/02; B01D 11/0296; B01D 11/0403; F25B 1/00; C11B 1/10; C11B 1/104; C11B 1/108; C11B 7/0008; C11B 7/0016; C11B 7/0025; C11B 7/0033; C11B 7/0058; C11B 9/025

See application file for complete search history.

(56) References Cited

U.S. PATENT DOCUMENTS

| | | | | |
|---|---|---|---|---|
| 4,147,624 | A * | 4/1979 | Modell | C02F 1/283 585/827 |
| 4,375,387 | A * | 3/1983 | deFilippi | B01D 3/143 208/321 |
| 5,294,303 | A * | 3/1994 | Robbins | B01D 3/007 202/205 |
| 5,707,673 | A * | 1/1998 | Prevost | C11B 1/104 210/651 |
| 10,589,189 | B2 * | 3/2020 | Sano | B01D 11/0407 |
| 11,185,793 | B2 * | 11/2021 | Sano | B01D 1/0047 |
| 11,364,452 | B2 * | 6/2022 | Sano | B01D 11/0292 |
| 2002/0182722 | A1 * | 12/2002 | Corr | B01D 11/028 422/288 |
| 2005/0210701 | A1 * | 9/2005 | Kanda | F26B 5/005 34/330 |
| 2009/0166175 | A1 * | 7/2009 | Waibel | B01D 11/028 202/185.1 |
| 2016/0091226 | A1 * | 3/2016 | Buese | F25B 13/00 422/284 |
| 2016/0144292 | A1 * | 5/2016 | Crandall | B01D 11/0207 422/255 |
| 2016/0158763 | A1 * | 6/2016 | Sano | B03B 5/48 62/503 |
| 2018/0028935 | A1 * | 2/2018 | Sano | C02F 1/283 |
| 2019/0060785 | A1 * | 2/2019 | Durward | B01D 11/0296 |
| 2021/0016203 | A1 * | 1/2021 | Sano | B01D 11/0407 |
| 2021/0077919 | A1 * | 3/2021 | Sano | B01D 36/00 |

FOREIGN PATENT DOCUMENTS

| | | |
|---|---|---|
| JP | 2003-112035 A | 4/2003 |
| WO | WO 03/101579 A1 | 12/2003 |
| WO | WO 2015/015631 A1 | 2/2015 |
| WO | WO 2015/033455 A1 | 3/2015 |

OTHER PUBLICATIONS

Japanese-language Written Opinion (PCT/ISA/237) issued in PCT Application No. PCT/JP2019/009182 dated Jun. 4, 2019 (five pages).

* cited by examiner

FIG. 5
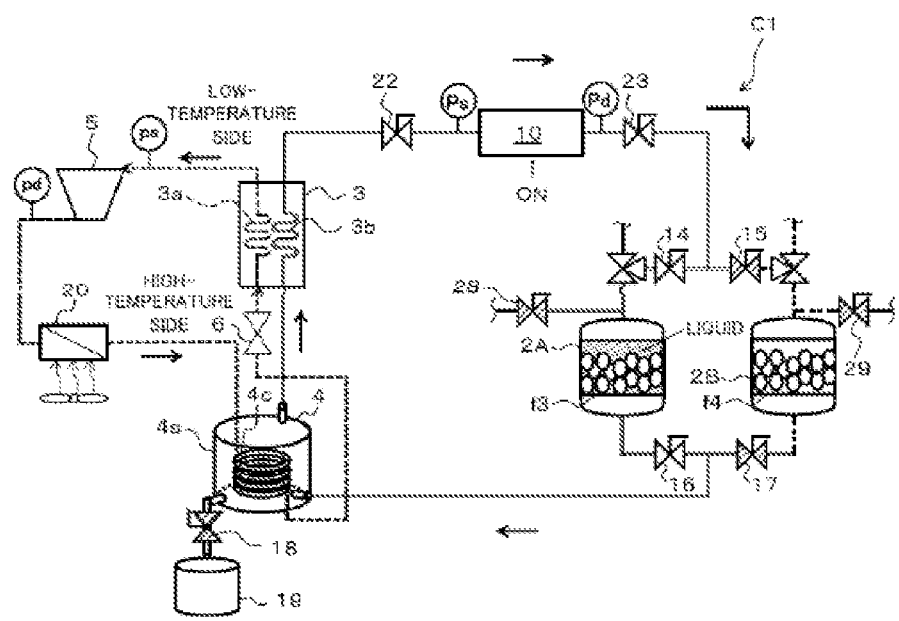
Symbol Legends for FIG. 5 and subsequent drawings:
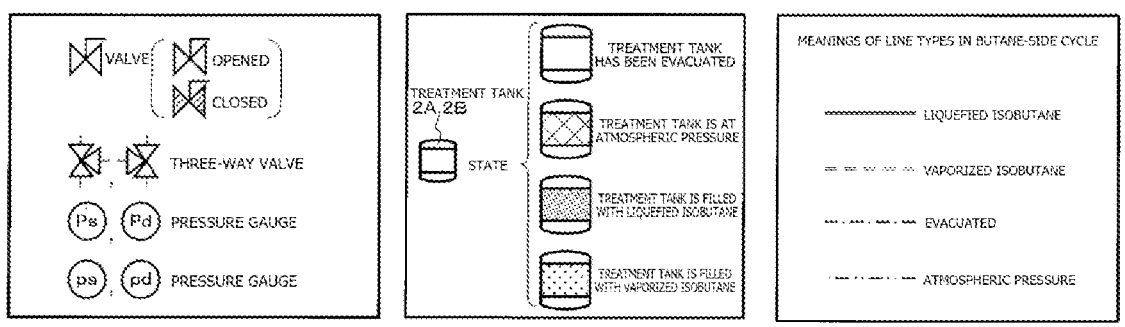

EXTRACTING APPARATUS, AND EXTRACTING-UNIT MANUFACTURING METHOD

TECHNICAL FIELD

The present invention relates to an extracting apparatus and an extracting-unit manufacturing method.

BACKGROUND ART

The conventional background art in this technical field includes Patent Document 1 and Patent Document 2.

Patent Document 1 discloses a configuration in which a phase-transition cycle of a substance A that is a gas at normal temperature and normal pressure, and can dissolve water and oil when in the liquefied state is used to separate a mixture of a solid and a liquid.

Patent Document 2 discloses an apparatus that recycles used activated charcoal as unused activated charcoal.

PRIOR ART DOCUMENT

Patent Documents

Patent Document 1: PCT Patent Publication No. WO2003/101579
Patent Document 2: PCT Patent Publication No. WO2015/033455

SUMMARY OF THE INVENTION

Problem to be Solved by the Invention

Meanwhile, there are various liquefied gases that are a gas at normal temperature and normal pressure, and can dissolve water and oil when in the liquefied state. As solid-liquid separation techniques using this characteristic of liquefied gases, Patent Document 1 mentioned above is disclosed.

Patent Document 1 discloses a method in which DME (DiMethyl Ether) is selected as an example of a liquefied gas, and high-water-content coal that is a mixture of coal and water is separated into water and coal. However, heat exchangers are provided at two locations for cold supplying from the outside in order to cause DME to circulate, and furthermore a pressure-recovery apparatus is installed also, thereby raising the apparatus cost.

Patent Document 2 discloses a method in which DME is used to eliminate impurities from used activated charcoal to which impurities have been absorbed, and recycle the activated charcoal. However, a method of efficiently discharging the eliminated impurities to the outside of a high pressure system is not described.

The present invention has been contrived in view of the circumstance described above, and an object of the present invention is to provide an extracting apparatus, and an extracting-unit manufacturing method that allow for an efficient extraction process, and for discharge of extracts to the outside of a high pressure system.

Means for Solving the Problem

In order to overcome the problem described above, an extracting apparatus according to the present invention is an extracting apparatus including: a first phase transition section that causes a phase transition of an extraction solvent from a gas to a liquid; a second phase transition section that causes a phase transition of the extraction solvent from a liquid to a gas; a treatment tank that stores a treated material, and receives an inflow of the extraction solvent that has been liquefied in the first phase transition section; a first valve that is provided between the second phase transition section and the treatment tank; and a second valve that is provided between the first phase transition section and the treatment tank. The second phase transition section is connected with a recovery valve.

Advantages of the Invention

The present invention can provide an extracting apparatus, and an extracting-unit manufacturing method that allow for an efficient extraction process, and for discharge of extracts to the outside of a high pressure system.

BRIEF DESCRIPTION OF THE DRAWINGS

FIG. 5 is a schematic diagram illustrating a state of steady operation of an extracting apparatus in a fifth embodiment;

MODES FOR CARRYING OUT THE INVENTION

In the following, embodiments of the present invention are explained in detail with reference to the drawings as appropriate.

The present invention is related to an extracting apparatus that takes out an extract from a mixture by using a liquefied gas (extraction solvent) as a solvent.

Specifically, an extract liquid is taken out from a mixture of a solid and the liquid. Alternatively, an extract solid is taken out from a mixture of a solid and the extract solid.

In the following embodiments, an extracting apparatus and an extraction method that allow for efficient extraction of a dissolved component dissolved in a liquefied gas used as an extraction solvent from a treated material are explained. Examples of treated materials include animals, plants, water treatment sludge and the like, and examples of dissolved components include water, oil, vitamins, minerals, amino acids, organic acids, fatty acids and the like.

In the following, an extracting apparatus and an extraction method according to a first embodiment are explained by using fishes as an example of a treated material, and a fish oil as an extract dissolved component; however, treated materials and dissolved components to which the present invention can be applied are not limited to fishes and fish oils.

The first embodiment can be applied to extraction and the like of fish oils containing docosahexaenoic acid (Docosa-Hexaenoic Acid, DHA), eicosa pentaenoic acid (Eicosa Pentaenoic Acid, EPA) or the like contained in fishes.

First Embodiment

Figure 1:
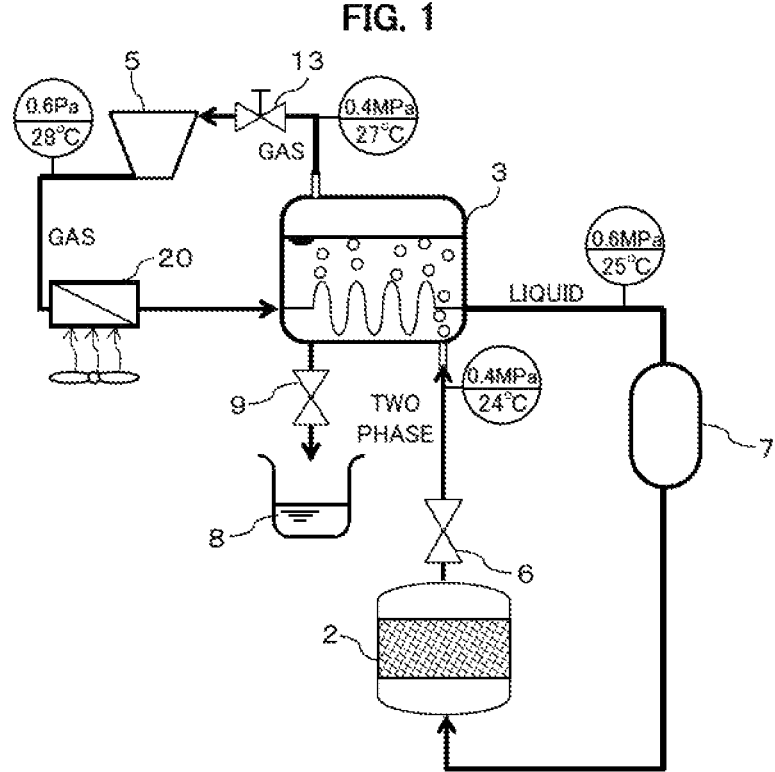
FIG. 1 is a schematic diagram illustrating a configuration of an extracting apparatus in a first embodiment.

One example of an apparatus configuration that realizes a method of extracting a cooking oil which is one of application targets of the present invention is explained by using FIG. 1.

The extracting apparatus in the first embodiment includes: a heat exchanger 3 for performing a phase transition of an extraction solvent; a compressor 5 that pumps the extraction solvent; a treatment tank 2 that stores fishes that are a treated material; an expansion valve 6 that is provided between the treatment tank 2 and the heat exchanger 3, and on a path through which the liquefied extraction solvent passes; a storage tank 7 that is provided between the treatment tank 2 and the heat exchanger 3, and on a path through which the liquefied extraction solvent passes; a shut-off valve 13 that is provided on a path through which the extraction solvent vaporized at the heat exchanger 3 passes; and a recovery valve 9 that recovers, in a recovery container 8, an extract extracted from the treated material.

In the first embodiment, as the extraction solvent, butane is used as a liquefied gas that can dissolve an oil. In addition, in the illustrated example, the heat exchanger 3 used is a shell and tube type heat exchanger, and the vaporized butane gas is caused to pass through the tube side. Various types of compressors such as a pump or a compressor can be applied as the compressor 5. In the first embodiment, a refrigeration cycle of the heat exchanger is formed by the extraction solvent butane itself. Accordingly, the compressor 5 used is a compressor for gas phase, and the expansion valve 6 needs to be provided on the liquid-phase path in order to reduce pressure, and form a temperature difference.

In the first embodiment, latent heat of evaporation necessary for the phase transition of butane is supplied by latent heat of condensation of itself. First, the butane gas having turned into a high-temperature, high-pressure gas is discharged from the compressor 5, passes through a cooler 20, and is transferred into the tube of the heat exchanger 3.

In the heat exchanger 3, while being condensed, the high-temperature butane gas transfers the heat of condensation toward the liquefied butane on the shell side. Accordingly, the liquefied butane on the shell side uses the supplied heat as the heat of evaporation to turn into a butane gas. The liquefied butane having been transferred into the tube and turned into a liquid passes through the storage tank 7, and is supplied to the treatment tank 2.

Filters are installed at the inlet side and outlet side of the treatment tank 2, and the fishes are sealed in between them. When the liquefied butane is supplied to the treatment tank 2, the liquefied butane comes into contact with the fishes efficiently by being stirred as necessary, and the fish oil in the fishes is dissolved into the liquefied butane. At this time, by making the flow of the liquefied butane in the treatment tank 2 flow upward, the filters are less likely to get clogged. Accordingly, this gives the advantage of being able to reduce the pressure loss in the treatment tank 2.

The liquefied butane having dissolved the fish oil in the treatment tank 2 is transferred to the expansion valve 6. The liquefied butane having dissolved the fish oil is subjected to pressure reduction when passing through the expansion valve 6. Accordingly, the temperature and pressure of the liquefied butane are lowered, and the liquefied butane turns into a two-phase flow, which is then transferred to the shell side of the heat exchanger 3. Due to the passage through the expansion valve 6, the temperature is lowered, and due to generation of a temperature difference between the shell side and the tube side, heat exchange is enabled.

In the heat exchanger 3, the liquefied butane on the shell side receives the heat of condensation of the butane gas on the tube side to thereby be evaporated to turn into a butane gas. At this time, the fish oil whose boiling point is higher than that of butane is not evaporated, but remains in the heat exchanger to be condensed. The evaporated butane gas is transferred again to the compressor 5, to thereby form a butane phase-transition cycle in the high pressure system. In addition, at the time of steady operation, the heat transfer from the latent heat of condensation to the latent heat of evaporation can proceed efficiently.

The cooler 20 is provided for eliminating heat that is generated due to the friction loss of the compressor 5 from the butane phase-transition cycle, and the temperature of the butane gas is measured constantly, and the cooler 20 is operated in accordance with results of the measurement such that a designated temperature is maintained.

When the dissolution of the fish oil in the treatment tank 2 is completed, the fish oil that should be recovered is kept in the heat exchanger 3 along with the liquefied butane. If waste matter discharge operation of opening the recovery valve 9 and recovering the fish oil is performed in this state, the liquefied butane is inevitably discharged also. Accordingly, it becomes necessary to inject a large amount of butane into the butane phase-transition cycle again.

In order to prevent this, the following recovery operation is performed in the present invention.

First, the expansion valve 6 is fully closed, and the compressor 5 is operated. In this state, the liquefied butane on the shell side keeps evaporating, and the butane gas on the tube side keeps being condensed. The condensed liquefied butane gets stored in the storage tank 7 installed downstream of the tube. The storage tank 7 needs to have room for the liquefied butane to flow in, at the time of fish-oil recovery operation. At the time of steady operation (at the time of extraction operation) when the expansion valve 6 is not fully closed, most of the inner space of the storage tank 7 is preferably filled with the butane gas, and the amount of the liquefied butane therein is preferably small.

In addition, the storage tank 7 is more preferably located below the heat exchanger 3 in the vertical direction. By making use of the influence of gravity, it becomes easier for the liquid to flow into the storage tank 7 located below. Thereby, it is made easier to eliminate the liquid butane from the tube, and it is possible to inhibit the liquid from being still on the tube side of the heat exchanger 3. Since it is possible to inhibit the latent heat of evaporation on the shell side from being used not only as the latent heat of condensation on the tube side, but also as the sensible heat for cooling the liquid on the tube side, it becomes possible to improve the efficiency of phase transition. For a similar reason, the treatment tank 2 is preferably arranged below the heat exchanger 3 in the vertical direction.

By keeping driving the compressor 5 while the expansion valve 6 is kept being closed, most of the butane is eliminated from the shell side of the heat exchanger 3, and the purity of the fish oil improves.

When the fish oil is taken out to a space under atmospheric pressure, the pressure on the shell side of the heat exchanger 3 is kept at or higher than atmospheric pressure in order to prevent the external air from flowing into the high pressure system.

At the time of target (fish oil) recovery operation, the pressure on the shell side of the heat exchanger 3 is constantly measured. At the time point when the pressure approaches atmospheric pressure, the shut-off valve 13 is fully closed, the pressure on the shell side is kept at or higher than atmospheric pressure, and the shut-off valve 13 is kept being fully closed until the time of discharge.

Here, in a case where the timing at which the shut-off valve 13 is fully closed is late, and the pressure on the shell side becomes equal to or lower than atmospheric pressure, the expansion valve 6 is temporarily released to supply butane, and the pressure on the shell side is increased. In addition, in a case where the compressor 5 used is a displacement compressor, a role of the shut-off valve 13 can be alternatively played by operation stop of the compressor 5. The fish oil can be recovered in the recovery container 8 by releasing the recovery valve 9 after completion of an adjustment of the pressure on the shell side of the heat exchanger 3 to an appropriate pressure.

In the first embodiment, the recovery operation of closing the expansion valve 6 and driving the compressor 5 is performed before the extract is discharged. Thereby, the amount of the liquefied butane remaining on the shell side of the heat exchanger 3 can be reduced. In addition, since the storage tank 2 that can store butane moving from the shell side to the tube side in the recovery operation is provided, it is made possible to perform the recovery operation described above efficiently.

Note that although, in the configuration illustrated in the first embodiment, the expansion valve 6 provided on the liquid-phase path is used as a shut-off valve that is closed fully at the time of recovery operation, a shut-off valve may be provided in addition to the expansion valve 6. Since the expansion valve 6 for forming the refrigeration cycle doubles as the shut-off valve in the first embodiment, this gives the advantage of being able to reduce the number of parts.

Note that the first embodiment is explained by using butane as an example of a gas to be used, similar extraction can be performed also by using propane, normal butane, isobutane, neopentane or isopentane. In addition, in a case where an extraction target is water or a water-soluble substance, dimethyl ether or ethyl methyl ether that can dissolve them is preferably used.

In addition, if the compressor 5 mentioned above is a model that requires a lubricant, there is a fear that the lubricant is mixed into the fish oil. Accordingly, the compressor is preferably an oil-free compressor, and for example, is preferably a diaphragm type compressor or a tube-pump type compressor. If a lubricant is used for the compressor 5, a harmless cooking oil or silicone oil is preferably used as the lubricant.

Second Embodiment

Figure 2:
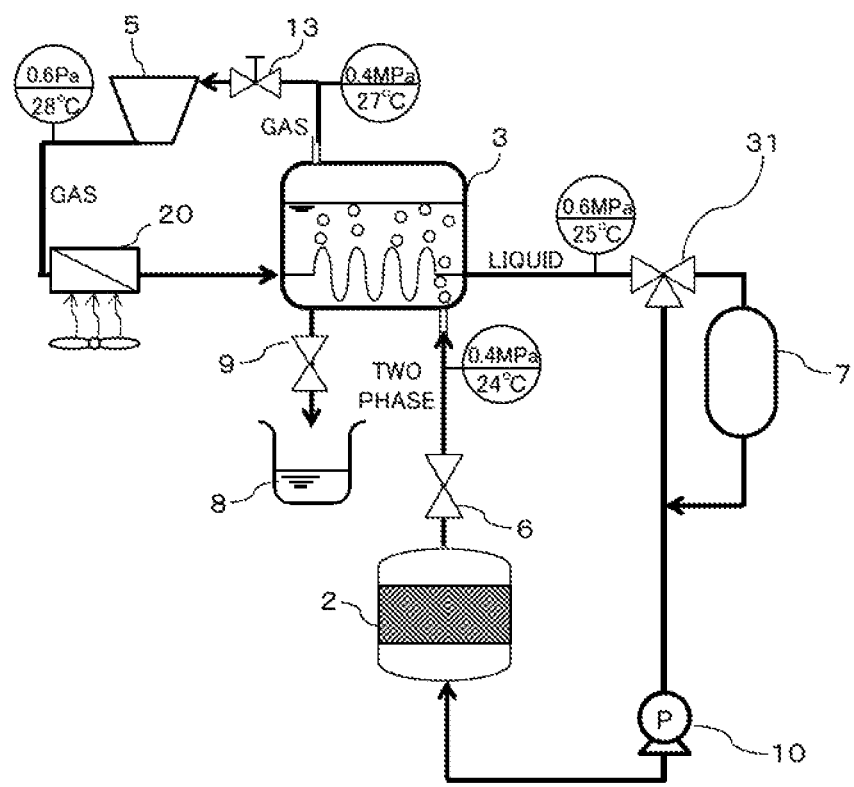
FIG. 2 is a schematic diagram illustrating a configuration of an extracting apparatus in a second embodiment.

FIG. 2 is a schematic diagram illustrating a configuration of an extracting apparatus in a second embodiment.

The second embodiment of the present invention is explained by using FIG. 2. Note that explanation of configurations similar to their counterparts in the first embodiment is omitted. The second embodiment is different from the first embodiment in the configuration from the downstream side of the tube side of the heat exchanger 3 to the treatment tank 2.

Although the second embodiment is the same as the first embodiment in that the storage tank 7 is provided on the path through which the liquefied butane liquefied in the heat exchanger 3 flows, but unlike the first embodiment, the storage tank 7 is provided in parallel. Further, a switch valve 31 is provided. The switch valve 31 switches the path such that the liquefied butane bypasses the storage tank 7 at the time of steady operation (at the time when the expansion valve 6 is opened), and that the liquefied butane flows through the storage tank 7 at the time of target (fish oil) recovery operation (at the time when the expansion valve 6 is closed fully).

The gas-liquid interface in the storage tank 7 has a larger area than that in a pipe. Accordingly, in a case where the liquefied gas used is a liquid that foams easily, if the liquefied gas is caused to pass through the storage tank 7 at the time of steady operation, the storage tank 7 is inevitably filled with the foam, and it becomes difficult to measure the position of the gas-liquid interface at the time of operation. In order to prevent such a situation from happening, the liquefied butane having flowed out of the tube side of the heat exchanger 3 is guided to the treatment tank 2 without passing through the storage tank 7 at the time of steady operation.

At the time of target recovery operation, the expansion valve 6 is closed fully, communication is established between the heat exchanger 3 and the storage tank 7 by the switch valve 31, and the liquefied butane is stored in the storage tank 7.

Although not a configuration essential for the second embodiment, a pump 10 is more preferably provided on the path through which butane having been liquefied in the heat exchanger 3 flows. By using the pump 10, since the pressure for transferring the liquefied butane can be increased, the liquefied gas can be transferred to the treatment tank 2 stably even in a case where there is significant pressure loss in the treatment tank 2. The installation position of the pump 10 is preferably below the treatment tank 2, the heat exchanger 3 and the storage tank 7 in the vertical direction in order to prevent deterioration of the efficiency of liquid transfer, which is caused by sucking of a gas. Even if the pump 10 is applied to the structure in which the storage tank 7 is arranged in series as described in the first embodiment, similar effects can be attained.

Third Embodiment

Figure 3:
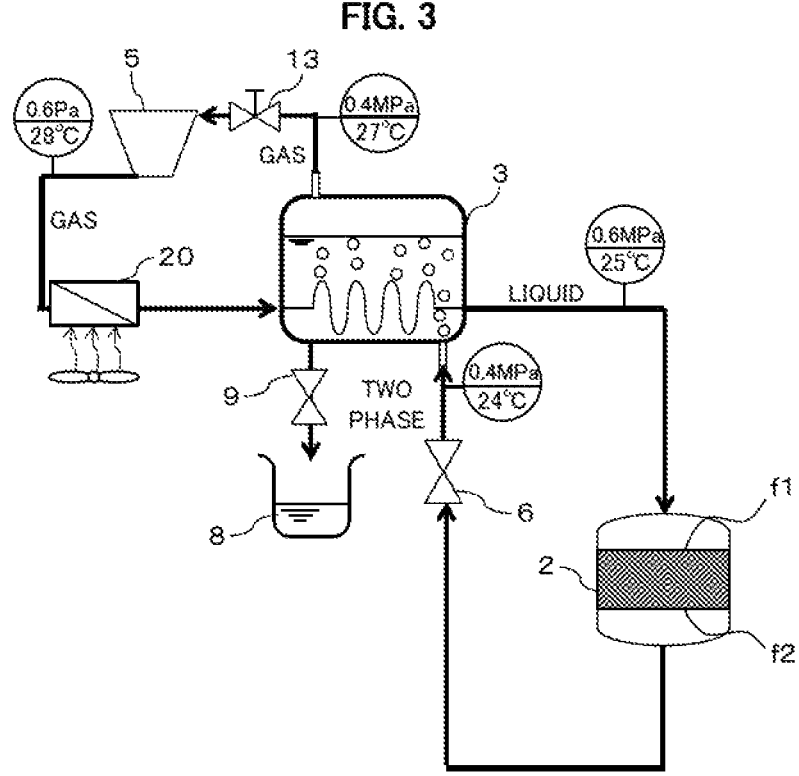
FIG. 3 is a schematic diagram illustrating a configuration of an extracting apparatus in a third embodiment.

FIG. 3 is a schematic diagram illustrating a configuration of an extracting apparatus in a third embodiment.

Another example of an apparatus configuration that is different from the first embodiment is explained by using FIG. 3. The third embodiment is different from the first embodiment in the configuration from the downstream side of the tube side of the heat exchanger 3 to the treatment tank 2.

The liquefied butane having flowed out from the tube side of the heat exchanger 3 is guided directly to the upper side of the treatment tank 2 in the vertical direction. The amount of gas sealed in in the high pressure system is adjusted such that the gas-liquid interface is located inside the treatment tank 2 at the time of steady operation, and the upper section is filled with the butane gas.

At the time of steady operation, the liquefied butane is dripped from the upper section inside the treatment tank 2, then contacts the fishes that are the treated material kept above a lower filter f2, and flows out from the outlet at the lower section.

At the time of target (fish oil) recovery operation, the expansion valve 6 is fully closed, and the liquefied butane discharged from the heat exchanger 3 is stored in the treatment tank 2.

Fourth Embodiment

Figure 4:
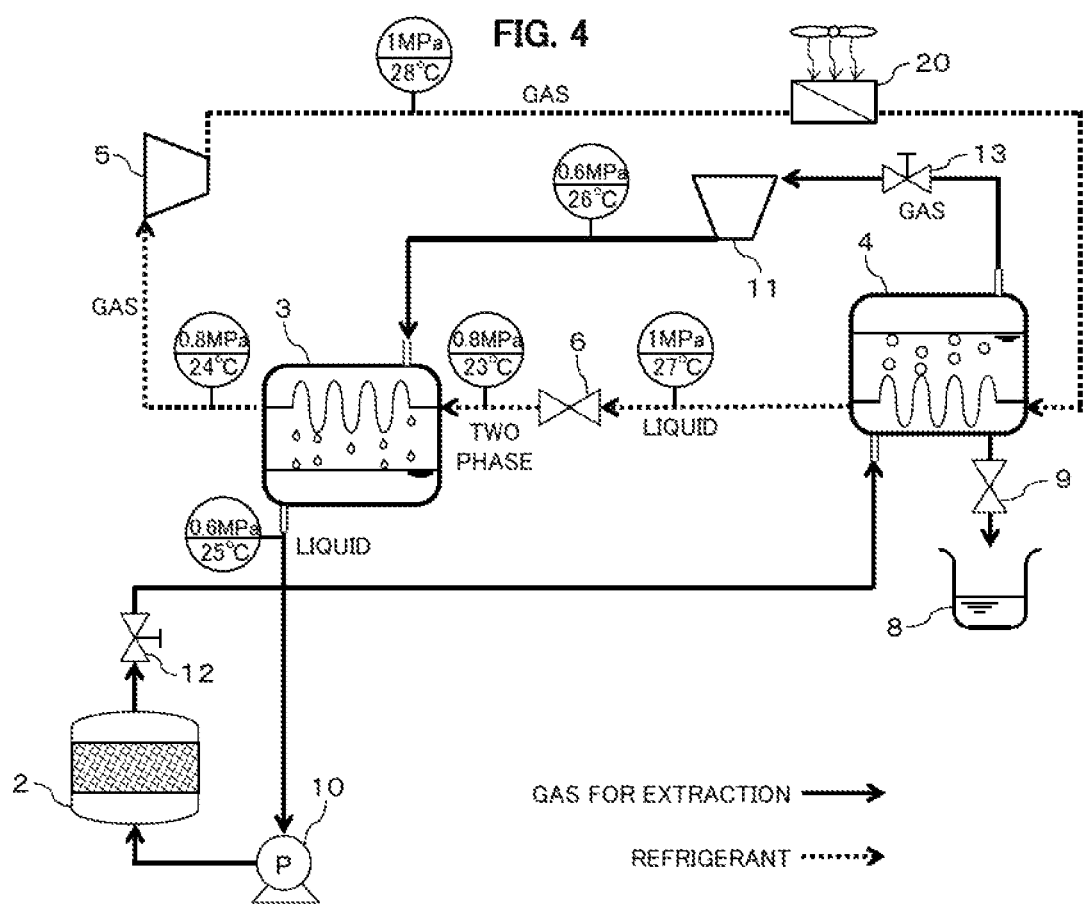
FIG. 4 is a schematic diagram illustrating a configuration of an extracting apparatus in a fourth embodiment.

FIG. 4 is a schematic diagram illustrating a configuration of an extracting apparatus in a fourth embodiment.

The fourth embodiment of the present invention is explained by using FIG. 4. Note that explanation of configurations similar to their counterparts in the first embodiment is omitted.

In the fourth embodiment, two types of gas, butane as a liquefied gas used for extraction and chlorofluorocarbon as a refrigerant used for heat transfer, are used. The gas for extraction to be used here need not be butane. In accordance with an extraction target, propane, normal butane, isobutane, neopentane, isopentane, dimethyl ether or ethyl methyl ether may be selected. The gas for heat transfer need not be chlorofluorocarbon. A gas that causes a phase transition at a temperature near room temperature and an appropriate pressure may be selected.

In the fourth embodiment, latent heat of evaporation and latent heat of condensation necessary for the phase transition of butane are transferred in a refrigeration cycle using chlorofluorocarbon. In addition, although shell and tube type heat exchangers are illustrated as examples of two heat exchangers 3 and 4, the heat exchanger 3 used for liquefaction of the butane gas may be a plate type heat exchanger for increasing efficiency.

While a first phase transition section for causing a phase transition of the extraction solvent from a gas to a liquid, and a second phase transition section for causing a phase transition of the extraction solvent from a liquid to a gas are constructed by using the heat exchanger 3 in the first embodiment, the first phase transition section and the second phase transition section are constructed by using the separate heat exchangers, the heat exchanger 3 and the heat exchanger 4, respectively, in the fourth embodiment. Then, the refrigeration cycle of chlorofluorocarbon is used in heat exchange at the heat exchangers 3 and 4.

First, chlorofluorocarbon having turned into a high-temperature high-pressure gas is discharged from the compressor 5, passes through the cooler 20, and is transferred into the tube of the heat exchanger 4. Here, while being condensed, the high-temperature chlorofluorocarbon gas transfers the heat of condensation toward the butane side. Accordingly, the liquefied butane on the shell side uses the supplied heat as the heat of evaporation to turn into a butane gas.

Next, the liquefied chlorofluorocarbon having turned into a liquid is transferred to the expansion valve 6 and is subjected to pressure reduction when passing through the expansion valve 6, and is decreased in temperature and pressure. Then, the liquefied chlorofluorocarbon turns into a two-phase flow to be transferred to the tube side of the heat exchanger 3. Here, while being condensed, the butane gas on the shell side of the heat exchanger 3 transfers the heat of condensation to the chlorofluorocarbon side, and the low-temperature liquefied chlorofluorocarbon uses the supplied heat as the heat of evaporation, and turns into a chlorofluorocarbon gas.

Next, the gasified chlorofluorocarbon gas is transferred to the compressor 5 to be compressed again, and forms the refrigeration cycle.

On the other hand, in the butane-side cycle, first, the liquefied butane discharged from the shell side of the heat exchanger 3 is transferred by the pump 10 to the treatment tank 2 filled with and keeping the fishes. In the treatment tank 2, the fish oil contained in the fishes is dissolved in the liquefied butane.

Next, the liquefied butane having dissolved the fish oil passes through a filter inside the treatment tank, passes through a shut-off valve 12, and is transferred to the heat exchanger 4. Since the heat exchanger 4 is continuously being supplied with the chlorofluorocarbon that is at a temperature slightly higher than the liquefied butane, the liquefied butane is heated by the latent heat of the chlorofluorocarbon, and turns into a butane gas, which is then discharged.

The fish oil having been dissolved in the liquefied butane is at a temperature equal to or lower than the boiling point. Accordingly, most of the fish oil does not evaporate, but stays inside the heat exchanger 4. The discharged high-purity butane gas passes through the shut-off valve 13, and is transferred to the heat exchanger 3 by a compressor 11.

Since the heat exchanger 3 is continuously being supplied with the chlorofluorocarbon that is at a temperature lower than the butane gas, the butane gas is cooled by the latent heat of evaporation of the chlorofluorocarbon, and turns into a liquefied butane, which is then discharged to form the butane phase-transition cycle. These are the steady operation.

Note that although in the example illustrated in the present embodiment, both the compressor 11 arranged on the gas-phase side flow passage and the pump 10 arranged on the liquid-phase side flow passage are described, this is not the sole example. It does not matter which one of the compressor 11 and the pump 10 a transferring section for the butane cycle is configured with, because what is required here is realization of the circulation of butane, which is the extraction solvent. In a case where the compressor 11 is used, an expansion valve is necessary in the butane cycle. This is because the pressure changed by the compressor 11 needs to be relaxed by using the expansion valve. As mentioned below, in order to recover a recovered material from the heat exchanger 4, recovery valves (12 and 13) are required for shutting off a part of the butane cycle from the external air when the recovery valve 9 is opened. If an additional expansion valve is provided in addition to the recovery valves, the cost increases. Accordingly, if the recovery valves serve as expansion valves, one valve can provide for a valve for compressor and a recovery valve, and thus it is possible to reduce the cost. On the other hand, in a case where the pump 10 that does not generate pressure changes is used, since it is not necessary to use expansion valves for the butane cycle, the recovery valves may not be expansion valves. In addition, if butane is caused to circulate by making use of gravity by arranging the heat exchanger 3 above the heat exchanger 4, this can be realized without both the compressor 11 and the pump 10.

Arranging pieces of equipment, the heat exchanger 3, the treatment tank 2 and the heat exchanger 4 in this order from above in the vertical direction gives the advantage of improving the efficiency of transfer of butane. The output power necessary for a transfer section of the butane cycle can be reduced, thus this contributes to reduction of power consumption and size reduction.

By continuing this steady operation, the concentration of the fish oil on the shell side of the heat exchanger 4 increases. After a target extraction amount of the fish oil is obtained, the fish-oil recovery operation is performed.

In the recovery operation, when the pump 10 is stopped, the shut-off valve 12 is closed fully, and the compressor 11 is operated, the pressure on the shell side of the heat exchanger 4 is reduced. Accordingly, evaporation of the remaining liquefied butane is promoted. By continuing the operation of the compressor 11, since the pressure on the downstream side of the compressor 11 increases, the butane gas is liquefied. Since the liquefied butane is transferred to the treatment tank 2, the liquefied butane in the heat exchanger 4 decreases, and the purity of the fish oil improves. In the operation to take out the fish oil to a space under atmospheric pressure, the shut-off valve 12, the shut-off valve 13 and the compressor 11 are controlled appropriately to keep the pressure on the shell side of the heat exchanger 4 at or higher than atmospheric pressure. The fish oil can be recovered in the recovery container 8 by releasing the recovery valve 9 after the pressure on the shell side of the heat exchanger 4 is adjusted to an appropriate pressure.

In addition, although in the example illustrated in the method mentioned above, the compressor 11 provided on the path on the butane side is used to eliminate the liquefied butane from the heat exchanger 4, the liquefied butane can be eliminated also by the operation of the compressor 5 provided on the path on the chlorofluorocarbon side instead of the compressor 11. By operating the compressor 5 while the shut-off valve 12 is fully closed, and the valve 13 is kept opened, the liquefied butane remaining in the heat exchanger 4 is vaporized, and turns into a liquefied butane again in the heat exchanger 3. The liquefied butane is guided to the treatment tank 2, and stored therein, and the purity of the fish oil in the heat exchanger 4 improves. Even in a case where there is not a compressor 11 in a transferring section in the butane cycle, and the pump 10 is used, the purity of the fish oil, which is the recovered material, in the heat exchanger 4 can be improved.

Fifth Embodiment

FIG. 5 is a schematic diagram illustrating a state of the steady operation of an extracting apparatus C1 in a fifth embodiment. The double solid lines in FIG. 5 illustrate the presence of a liquefied butane in the cycle on the chlorofluorocarbon (refrigerant) side. The dense dots in a treatment tank 2A in FIG. 5 illustrate the presence of a liquefied butane, and the outlined space of a treatment tank 2B illustrates a vacuum.

Note that symbols of constituent elements and the like in figures of the cycles in FIG. 5 and subsequent figures have the meanings as illustrated in the symbol legends shown in FIG. 5.

In the extracting apparatus C1 in the fifth embodiment, the one treatment tank 2 in the extracting apparatus in the fourth embodiment is changed to the two treatment tanks 2A and 2B.

In the extracting apparatus C1 in the fifth embodiment, the two treatment tanks 2A and 2B are arranged in parallel between the pump 10 and the heat exchanger 4. In the treatment tanks 2A and 2B, filters f3 and f4 for filtering out solids are installed, respectively, at their lower sections.

Then, the treatment tank 2A is arranged between valves 14 and 16. In addition, the treatment tank 2B is arranged between valves 15 and 17. Thereby, the treatment tank 2A can be disconnected and isolated from the butane-side cycle (illustrated by the double solid lines in FIG. 5) by closing the valves 14 and 16. Similarly, the treatment tank 2B can be disconnected and isolated from the butane-side cycle by the valves 15 and 17. That is, the treatment tanks 2A and 2B can be activated in isolation from each other in the butane-side cycle.

The steady operation of the extracting apparatus C1 is activated in the following manner.

It is assumed here that extraction is performed in the treatment tank 2A. At this time, the valves 14 and 16 that connect the treatment tank 2A with the butane-side cycle (illustrated by the double solid lines in FIG. 5) are opened. On the other hand, the valves 15 and 17 that connect the treatment tank 2B with the butane-side cycle are closed to disconnect the treatment tank 2B from the butane-side cycle.

First, in the chlorofluorocarbon-side cycle (illustrated by the dashed lines in FIG. 5), chlorofluorocarbon having turned into a high-temperature high-pressure gas is discharged from the compressor 5, passes through a cooling fan 20f which is a cooler, and is transferred into a tube 4c of the heat exchanger 4. Here, while being condensed, the high-temperature chlorofluorocarbon gas transfers the heat of condensation toward the butane side. Accordingly, the liquefied butane closer to the shell 4s uses the supplied heat as the heat of evaporation to turn into a butane gas.

Next, the liquefied chlorofluorocarbon having turned into a liquid is transferred to the expansion valve 6 and is subjected to pressure reduction when passing through the expansion valve 6, and is decreased in temperature and pressure. Then, the chlorofluorocarbon turns into a two-phase flow to be transferred toward a first tube 3a of the heat exchanger 3. Here, while being condensed, the butane gas closer to a second tube 3b of the heat exchanger 3 transfers the heat of condensation to the liquefied chlorofluorocarbon closer to the first tube 3a. In turn, the low-temperature liquefied chlorofluorocarbon flowing through the first tube 3a uses the supplied heat as the heat of evaporation, and turns into a chlorofluorocarbon gas.

Next, the gasified chlorofluorocarbon gas is transferred to the compressor 5 to be compressed again, and forms the refrigeration cycle.

Note that although in the example illustrated in the present embodiment, the refrigeration cycle is configured with the chlorofluorocarbon-side cycle, the refrigeration cycle may be configured only with the butane-side cycle as described in the first to third embodiments.

On the other hand, in the butane-side cycle (illustrated by the double solid lines in FIG. 5), first, the liquefied butane discharged from the side of the second tube 3b of the heat exchanger 3 is transferred by the pump 10 to the treatment tank 2A filled with and keeping the fishes, which are the treated material. Note that, similar to the fourth embodiment, the compressor 11 may be used instead of the pump 10.

In the treatment tank 2A, the fish oil (extract) contained in the fishes is dissolved in the liquefied butane.

Next, the liquefied butane having dissolved the fish oil passes through the filter f3 inside the treatment tank 2A, solid contents are eliminated by the filter f3, and the liquefied butane passes through the opened valve 16, and is transferred to the heat exchanger 4. Since the tube 4c of the heat exchanger is continuously being supplied with the chlorofluorocarbon that is at a temperature slightly higher than the liquefied butane, the liquefied butane is heated by the latent heat of the chlorofluorocarbon, and turns into a butane gas, which is then discharged.

Since the first tube 3a of the heat exchanger 3 is continuously being supplied with the chlorofluorocarbon that is at a temperature lower than the butane gas, the butane gas is cooled by the latent heat of evaporation of the chlorofluorocarbon, and turns into a liquefied butane, which is then discharged from the second tube 3b to form the butane phase-transition cycle. These are the steady operation. Note that FIG. 5 illustrates the state where the treatment tank 2A is filled with a raw material and the liquefied butane, and the treatment tank 2B has a raw material therein, and is evacuated.

In the example explained in the present embodiment, two cycles in total, the butane-gas-side cycle and the chlorofluorocarbon-gas-side cycle, are provided. In this case, since it is not necessary to change the pressure in the butane-gas-side cycle, the valves may not be used as expansion valves. On the other hand, in the configuration, the heat exchange cycle may be constructed in the butane-side cycle as in the first embodiment. In that case, the valve 16 and the valve 17 are used as expansion valves to thereby change the pressure.

By continuing the steady operation, the liquefied butane closer to the shell 4s of the heat exchanger 4 decreases, the purity of the fish oil improves, and the concentration of the fish oil increases. After a target extraction amount of the fish oil is obtained, the process proceeds to the transfer operation of transferring the liquefied butane from the treatment tank 2A to the treatment tank 2B, and the fish-oil recovery operation.

Before proceeding to the recovery operation, preferably, condensation operation of fully closing the valve 16, opening the valve 15, and operating the compressor 5 on the chlorofluorocarbon-side cycle is performed. By doing so, the liquefied butane remaining in the heat exchanger 4 is vaporized, and the purity of the fish oil in the heat exchanger 4 improves. Since the treatment tank 2B plays a role of the storage tank 7 described in the second embodiment, the storage tank 7 can be omitted in the present embodiment. In addition, since the amount of the liquefied butane remaining in the heat exchanger 4 can be reduced by performing the condensation operation, the amount of butane released to the outside at the time of the recovery operation can be reduced. Accordingly, the loss of butane per cycle can be reduced.

After the transfer operation is performed, the condensation operation may be performed, and the recovery operation may be performed thereafter. Alternatively, after the condensation operation is performed, the recovery operation may be performed, and the transfer operation may be performed thereafter. In the case of the former, the efficiency becomes better because the recovery operation and replacement of raw materials mentioned below can be performed in parallel.

Before the fish-oil recovery operation, the operation of transferring the liquefied butane from the treatment tank 2A to the treatment tank 2B is performed.

Figure 6:
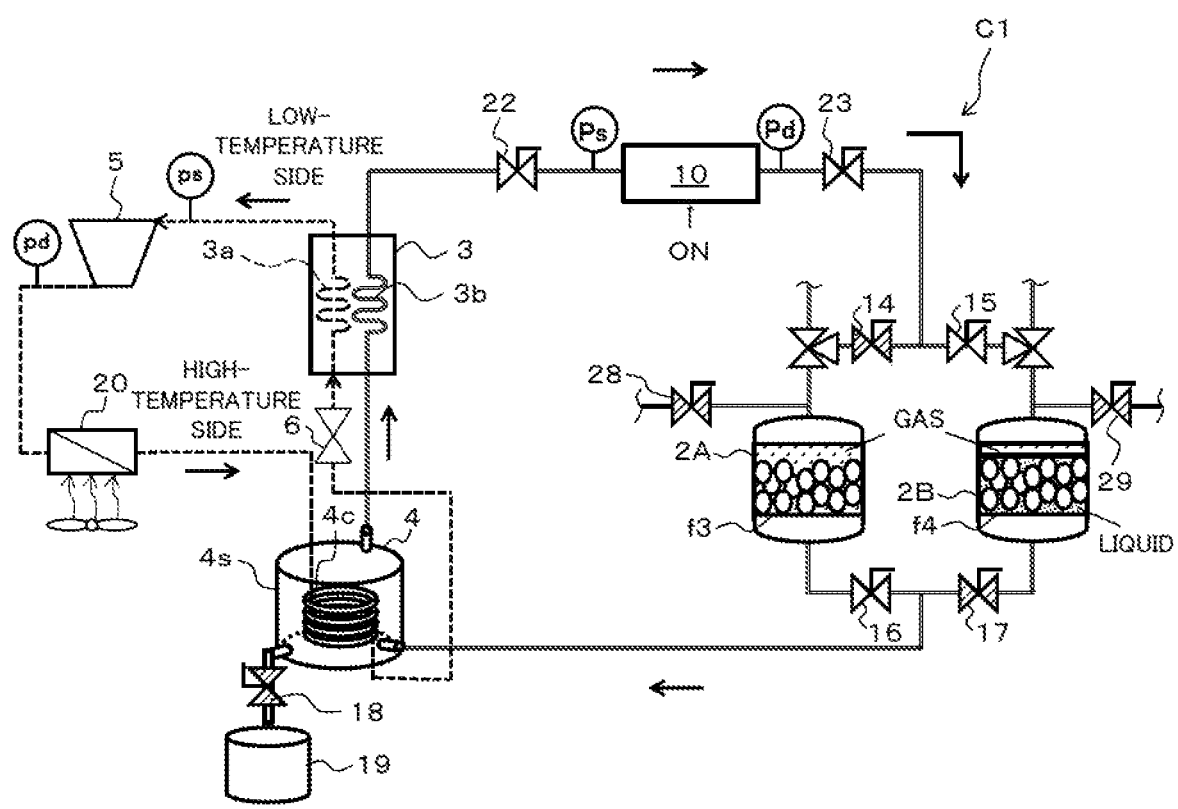
FIG. 6 is a schematic diagram illustrating a state of transfer operation of the extracting apparatus in the fifth embodiment.

FIG. 6 is a schematic diagram illustrating a state of the transfer operation of the extracting apparatus C1 in the fifth embodiment.

At the time of the operation of transferring the liquefied butane in the treatment tank 2A to the treatment tank 2B, the valve 14 closer to the treatment tank 2A is closed, and the valve 16 closer to the treatment tank 2A is opened. On the other hand, the valve 15 closer to the treatment tank 2B is opened, and the valve 17 closer to the treatment tank 2B is closed.

The chlorofluorocarbon-side cycle (illustrated by the dashed lines in FIG. 5) is performed in a similar manner to that in the steady operation described above.

On the other hand, in the butane-side cycle (illustrated by the double solid lines in FIG. 6), the liquefied butane having dissolved the fish oil inside the treatment tank 2A passes through the filter f3, passes through the opened valve 16, and is transferred to the heat exchanger 4. Since the tube 4c of the heat exchanger 4 is continuously being supplied with the chlorofluorocarbon that is at a temperature slightly higher than the liquefied butane, the liquefied butane in the shell 4s of the heat exchanger 4 is heated by the latent heat of the chlorofluorocarbon, and turns into a butane gas, which is then discharged toward the second tube 3b of the heat exchanger 3.

Since the first tube 3a of the heat exchanger 3 is continuously being supplied with the chlorofluorocarbon that is at a temperature lower than the butane gas, the butane gas in the second tube 3b is cooled by the latent heat of evaporation of the chlorofluorocarbon, and turns into a liquefied butane, which is then discharged.

Figure 7:
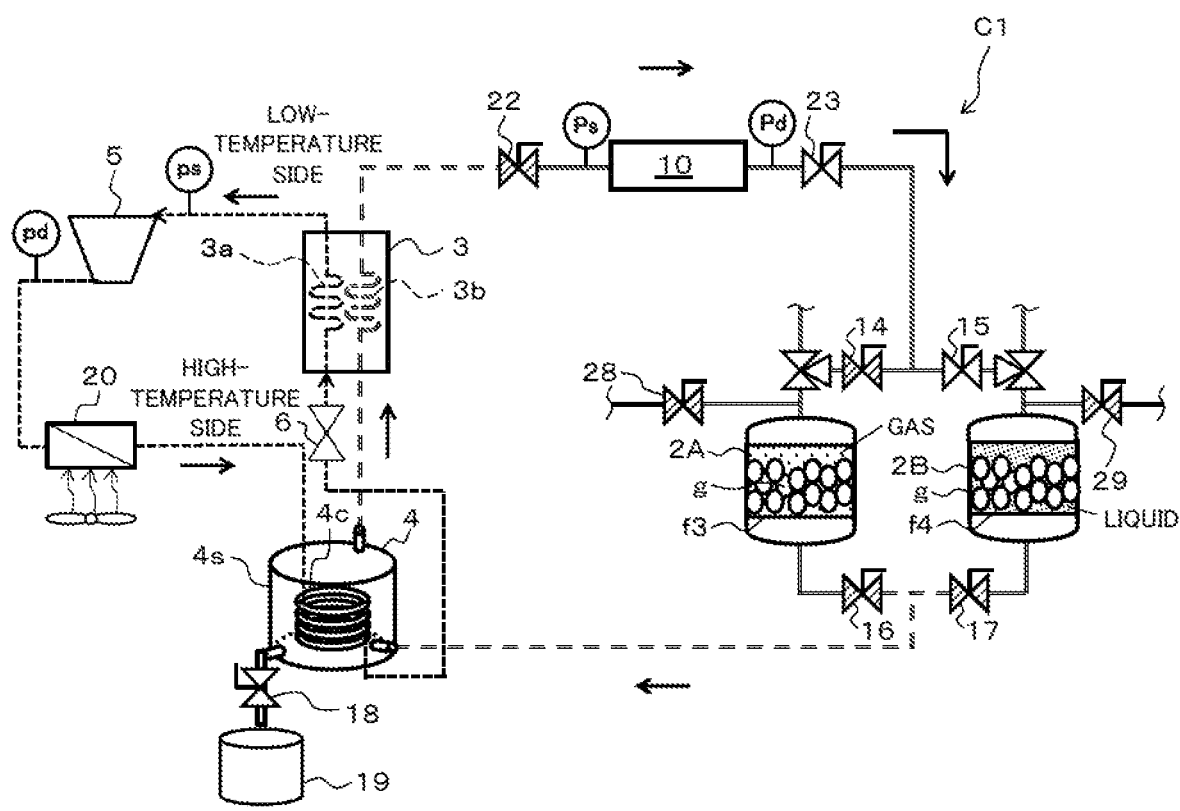
FIG. 7 is a schematic diagram illustrating a state of recovery operation of the extracting apparatus in the fifth embodiment.

By continuing the transfer operation mentioned above, the transfer of the liquefied butane from the treatment tank 2A to the treatment tank 2B ends (see FIG. 7).

FIG. 7 is a schematic diagram illustrating a state of the recovery operation of the extracting apparatus C1 in the fifth embodiment. In FIG. 7, the double solid lines illustrate the liquefied butane, and the double dashed lines illustrate the presence of vaporized butane.

Subsequently, the extracting apparatus C1 proceeds to the recovery operation from the transfer operation.

In operation of taking out the extract (fish oil) to an oil reservoir 19 under atmospheric pressure in the recovery operation, a valve 22 is fully closed, and the compressor 5 in the chlorofluorocarbon-side cycle is stopped. Then, the valve 16 and the valve 17 are fully closed, the pump 10 is stopped, and the pressure on the side of the shell 4s of the heat exchanger 4 is maintained at or higher than atmospheric pressure. The fish oil is recovered in the oil reservoir (recovery container) 19 by releasing a recovery valve 18 after the pressure on the side of the shell 4s of the heat exchanger 4 is adjusted to an appropriate pressure.

Thereafter, extraction is performed in the treatment tank 2B. At this time, the valves 15 and 17 that connect the treatment tank 2B with the butane-side cycle (illustrated by the double solid lines in FIG. 7) are opened. On the other hand, the valves 14 and 16 that connect the treatment tank 2A with the butane-side cycle are closed to disconnect the treatment tank 2A from the butane-side cycle.

Then, steady operation, transfer operation and recovery operation similar to those for the treatment tank 2A mentioned above are performed.

Thereafter, a raw material g is fed to the treatment tank 2A and the treatment tank 2B alternately, and extraction in the treatment tank 2A and extraction in the treatment tank 2B are performed alternately.

According to the configuration described above, the valves 14 and 16 and the valves 15 and 17 for disconnection from the butane-side cycle are provided at the upper sections and lower sections of all of a plurality of raw material containers, which are the treatment tank 2A and the treatment tank 2B, respectively.

By opening and closing the valves 14 and 16, and opening and closing the valves 15 and 17, the treatment tank 2A and the treatment tank 2B can be isolated from the circuit in the butane-side cycle. Accordingly, the extraction of the extract can be performed simultaneously with the transfer operation, and the treatment tank 2A and the treatment tank 2B can be activated (operated) continuously. Accordingly, highly efficient extraction becomes possible. Because of this, the extraction can be performed in a short time.

In addition, the liquefied gas in the treatment tank 2A can be transferred to the other treatment tank 2B efficiently. Similarly, the liquefied gas in the treatment tank 2B can be transferred to the other treatment tank 2A efficiently.

Note that although there are two treatment tanks, the treatment tank 2A and the treatment tank 2B, in the illustrated example, three or more treatment tanks may be provided. By providing a large number of treatment tanks, it is possible to attempt to shorten the length of time of processes for extracts that take a long time for extraction.

Sixth Embodiment

Figure 8:
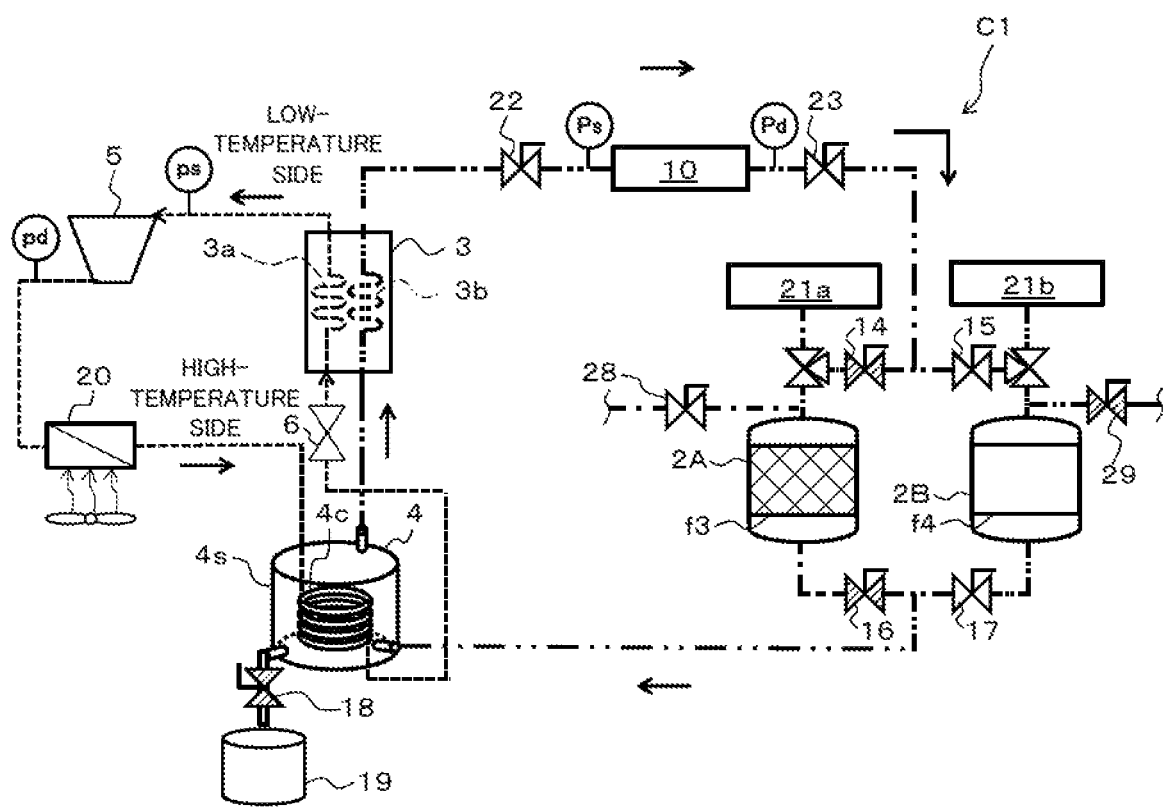
FIG. 8 is a schematic diagram illustrating a configuration of an extracting apparatus in a sixth embodiment.

FIG. 8 is a schematic diagram illustrating a configuration of an extracting apparatus C1 in a sixth embodiment. The two-dot chain lines in FIG. 8 illustrate that the butane-side cycle is a vacuum.

In the extracting apparatus C1 in the sixth embodiment, the treatment tank 2A and a vacuum pump 21a are provided between the valves 14 and 16, and the treatment tank 2B and a vacuum pump 21b are provided between the valves 15 and 17. Since other configurations are similar to their counterparts in the fifth embodiment, identical constituent elements are indicated by being given the same reference characters, and explanation thereof is omitted.

As illustrated in FIG. 8, in the butane-side cycle (illustrated by the two-dot chain lines in FIG. 8), the valves 14 and 16 are closed to isolate the treatment tank 2A from the butane-side cycle. Then, the valves 15, 17, 22 and 23 are opened, and the vacuum pump 21b is activated. Thereby, the butane-side cycle including the treatment tank 2B can be evacuated in isolation from the treatment tank 2A.

Similarly, in the butane-side cycle, the valves 15 and 17 are closed to isolate the treatment tank 2B. Then, the valves 14, 16, 22 and 23 are opened, and the vacuum pump 21a is activated. Thereby, the butane-side cycle including the treatment tank 2A can be evacuated in isolation from the treatment tank 2B.

In addition, it is also possible to close the valves 14 and 16 to isolate the treatment tank 2A from the circuit, and to activate the vacuum pump 21a to evacuate the treatment tank 2A. Similarly, it is also possible to close the valves 15 and 17 to isolate the treatment tank 2B from the circuit, and to activate the vacuum pump 21b to evacuate the treatment tank 2B.

According to the configuration described above, the treatment tank 2A, the treatment tank 2B and the butane-side cycle (illustrated by the two-dot chain lines in FIG. 8) can be evacuated. Accordingly, the volume of the butane-side cycle can be used for the extraction work without any waste, by not allowing air to occupy a part of the volume.

<<Modification Example of Sixth Embodiment>>

Figure 9:
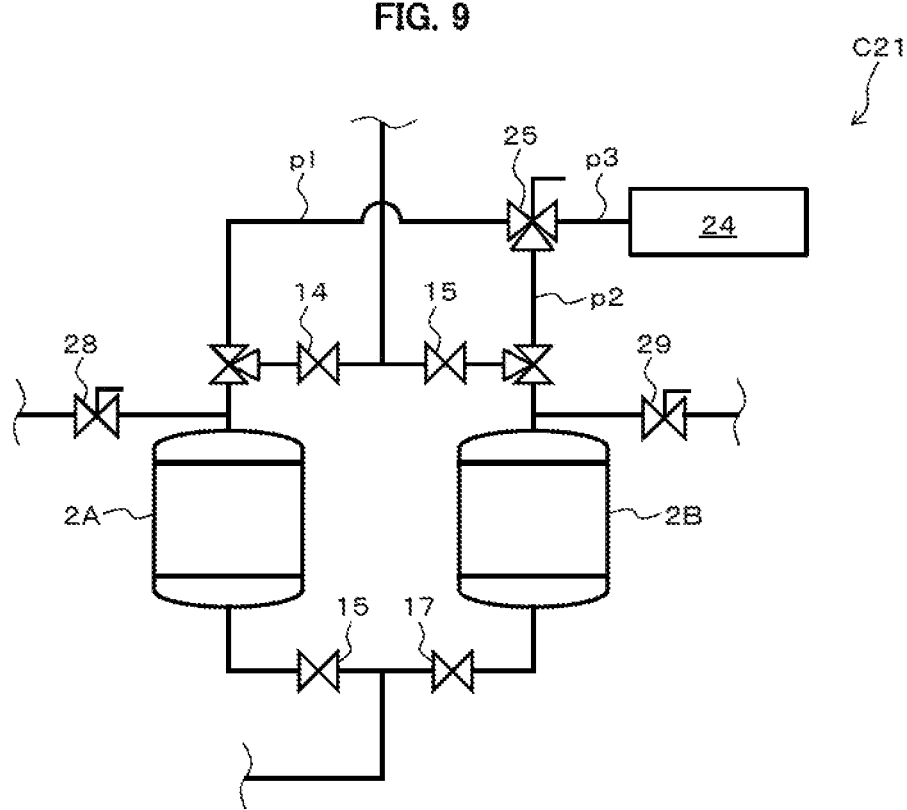
FIG. 9 is a schematic diagram illustrating a configuration of sections around treatment tanks of an extracting apparatus in a first modification example of the sixth embodiment.

FIG. 9 is a schematic diagram illustrating a configuration of sections around the treatment tanks 2A and 2B of an extracting apparatus C21 in a first modification example of the sixth embodiment.

In the first modification example of the sixth embodiment, one vacuum pump 24 is provided near the treatment tanks 2A and 2B in the fifth embodiment. Since other configurations are similar to their counterparts in the fifth embodiment, identical constituent elements are indicated by being given the same reference characters, and explanation thereof is omitted.

In the extracting apparatus C21 of the first modification example, a pipe p1 communicating with the treatment tank 2A, and a pipe p2 communicating with the treatment tank 2B are provided, and a three-way valve 25 is provided between a pipe p3 communicating with the vacuum pump 24, and the pipes p1 and p2.

By causing the three-way valve 25 to establish communication between the pipe p3 communicating with the vacuum pump 24, and the pipe p1 communicating with the treatment tank 2A, and closing off the pipe p2 communicating with the treatment tank 2B, the treatment tank 2A, and the butane-side cycle (illustrated by the double solid line FIG. 5) connected to the treatment tank 2A can be evacuated. At this time, the work can be performed in isolation, without making the treatment tank 2B evacuated.

In addition, by causing the three-way valve 25 to establish communication between the pipe p3 communicating with the vacuum pump 24, and the pipe p2 communicating with the treatment tank 2B, and closing off the pipe p1 communicating with the treatment tank 2A, the treatment tank 2B and the butane-side cycle connected to the treatment tank 2B can be evacuated. At this time, the work can be performed in isolation, without making the treatment tank 2A evacuated.

According to the configuration of the first modification example, the treatment tank 2A, the treatment tank 2B and the butane-side cycle (illustrated by the two-dot chain lines in FIG. 8) can be evacuated by the one vacuum pump 24. In addition, by using the three-way valve 25, it is possible to perform switching between the treatment tank 2A and the treatment tank 2B to be evacuated.

In addition, since the treatment tank 2A and the treatment tank 2B can be isolated, when the transfer of the liquefied isobutane to the treatment tank 2A or the treatment tank 2B is completed, the extraction work in the treatment tank 2A or the treatment tank 2B becomes possible. Accordingly, continuous operation of the extraction work is possible.

Figure 10:
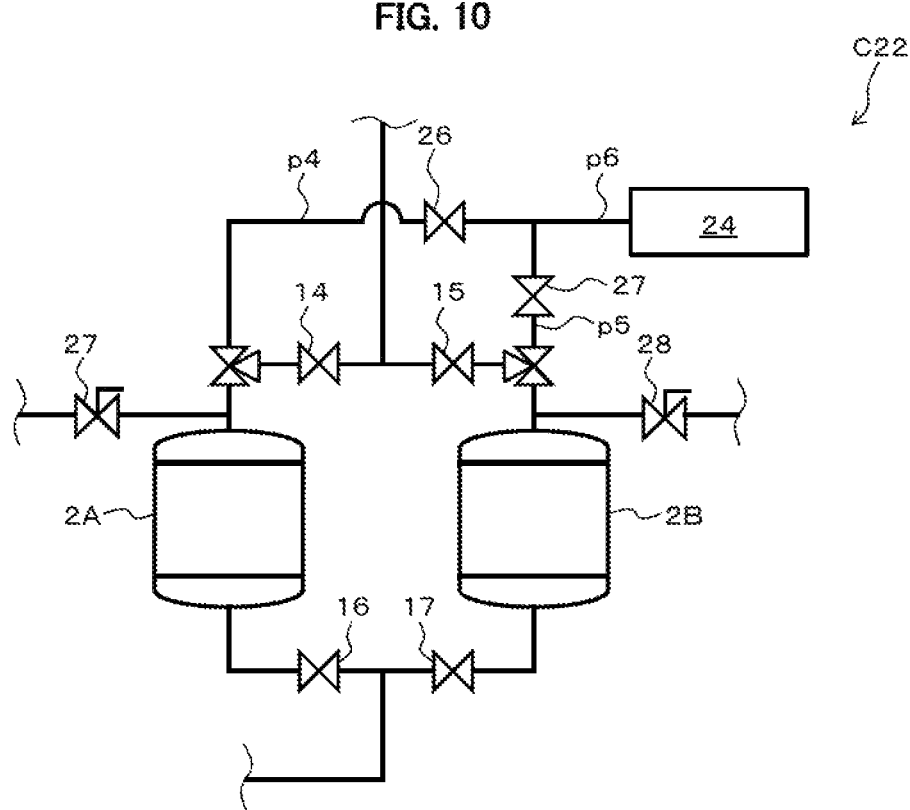
FIG. 10 is a schematic diagram illustrating a configuration of sections around the treatment tanks of an extracting apparatus in a second modification example of the sixth embodiment.

FIG. 10 is a schematic diagram illustrating a configuration of sections around the treatment tanks 2A and 2B of an extracting apparatus C22 in a second modification example of the sixth embodiment.

In the configuration in the second modification example of the sixth embodiment, the one vacuum pump 24 is provided near the treatment tanks 2A and 2B, and switching between the treatment tank 2A and the treatment tank 2B is performed by a valve 26 and a valve 27. Since other configurations are similar to their counterparts in the fifth embodiment, identical constituent elements are indicated by being given the same reference characters, and explanation thereof is omitted.

In the extracting apparatus C22 in the second modification example, a pipe p4 communicating with the treatment tank 2A, and a pipe p5 communicating with the treatment tank 2B are provided. Then, the valve 26 is provided between a pipe p6 communicating with the vacuum pump 24 and the pipe p4 communicating with the treatment tank 2A, and the valve 27 is provided between the pipe p6 communicating with the vacuum pump 24 and the pipe p5 communicating with the treatment tank 2B.

With this configuration, by opening the valve 26 and closing the valve 27, the treatment tank 2A and the butane-side cycle connected to the treatment tank 2A can be evacuated. At this time, the work can be performed in isolation, without making the treatment tank 2B evacuated.

In addition, by opening the valve 27 and closing the valve 26, the treatment tank 2B and the butane-side cycle connected to the treatment tank 2B can be evacuated. At this time, the work can be performed in isolation, without making the treatment tank 2A evacuated.

According to the configuration of the second modification example, the treatment tank 2A, the treatment tank 2B and the butane-side cycle can be evacuated by the one vacuum pump 24. In addition, by opening and closing the valve 26 and the valve 27, it is possible to perform switching between the treatment tank 2A and evacuate the treatment tank 2B to be evacuated.

Seventh Embodiment

In a seventh embodiment, a method of operating an extracting apparatus C3 that is equivalent to the extracting apparatus C1 of the fifth embodiment which is provided with two vacuum pumps 21a and 21 is explained. Since other configurations are similar to their counterparts in the extracting apparatus C1 of the fifth embodiment, those are indicated by being given similar reference characters, and detailed explanation thereof is omitted.

The extracting apparatus C3 in the seventh embodiment is controlled by a controller E3.

Each of the following steps is controlled by the controller E3.

Figure 11:
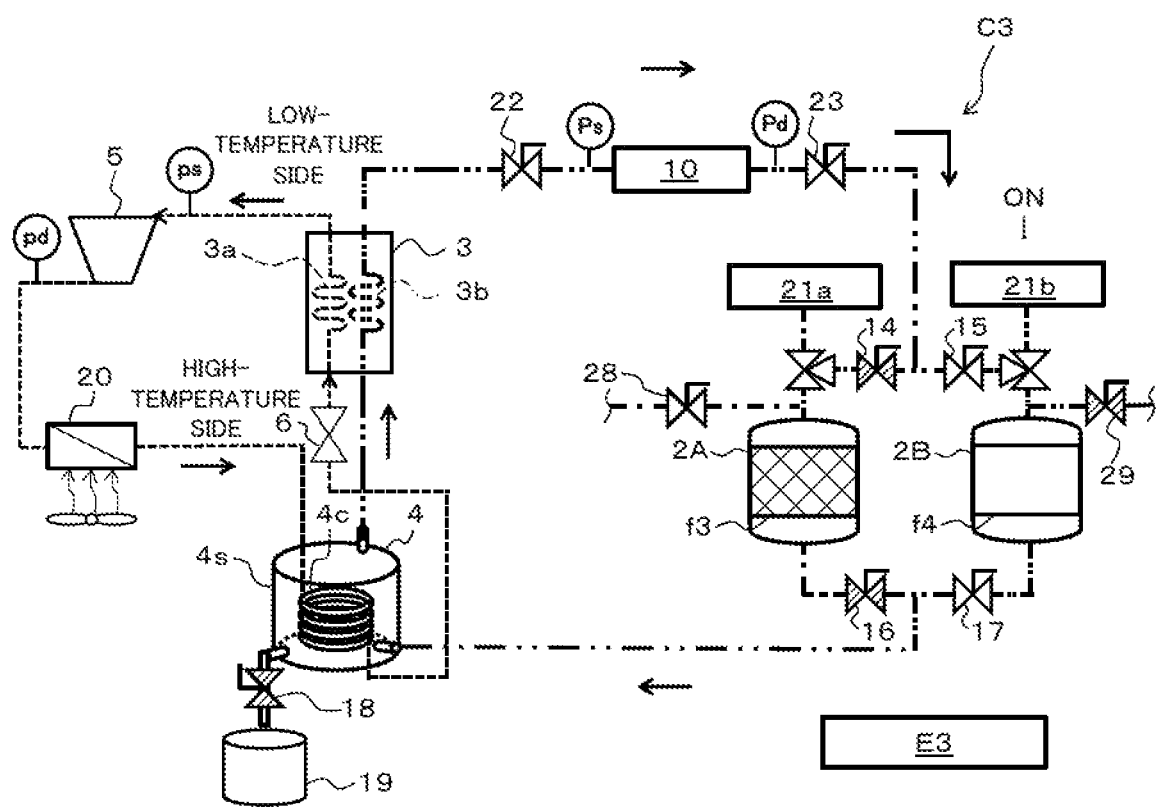
FIG. 11 is a schematic diagram of a state of an extracting apparatus in a seventh embodiment at Step 1 where the treatment tank has been evacuated.

FIG. 11 is a schematic diagram of a state of the extracting apparatus C3 in the seventh embodiment at Step 1 where the treatment tank 2B has been evacuated. The two-dot chain lines in FIG. 11 illustrate that the butane-side cycle is a vacuum.

In the extracting apparatus C3 in the seventh embodiment, the vacuum pump 21a and an exhaust valve 28 are connected to each other between the valve 14 and the valve 16. In addition, the vacuum pump 21b and an exhaust valve 29 are connected to each other between the valve 15 and the valve 17.

Here, the pump 10 may better be installed at the lowermost section. Thereby, the transfer power of the pump 10 can be transmitted most efficiently to butane, and cause the butane to circulate with less loss.

In the following, a method of operating the extracting apparatus C3 is explained.

As Step 1 (FIG. 11), the treatment tank 2B and the butane-side cycle (illustrated by the two-dot chain lines in FIG. 11) are evacuated. First, the exhaust valve 29 is closed, the valves 15, 17, 22 and 23 are opened, and the vacuum pump 21b is activated. Thereby, the butane-side cycle (the two-dot chain lines in FIG. 11) including the treatment tank 2B is evacuated.

Then, the valves 14 and 16 are closed, and the exhaust valve 28 is opened. Thereby, the treatment tank 2A is disconnected from the butane-side cycle, and the pressure of the treatment tank 2A is made atmospheric pressure.

Figure 12:
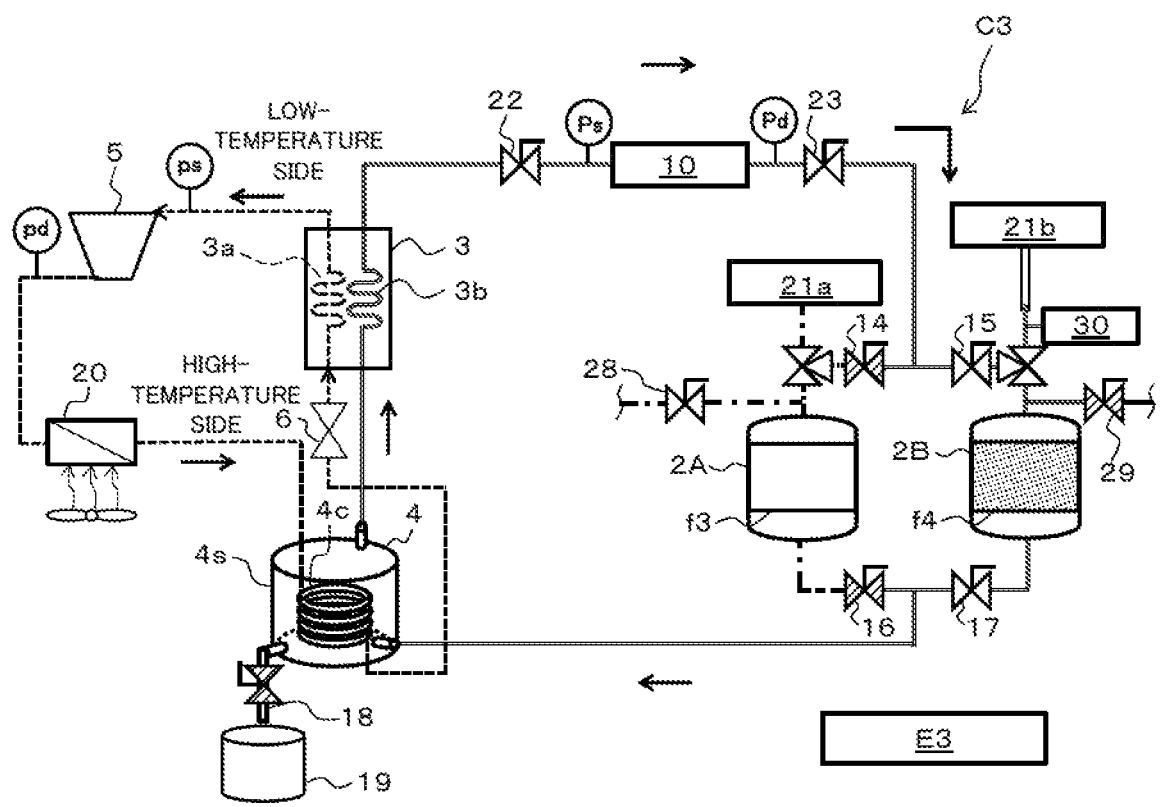
FIG. 12 is a schematic diagram of a state of the extracting apparatus in the seventh embodiment at Step 2 where a liquefied isobutane has been sealed in in the treatment tank.

FIG. 12 is a schematic diagram of a state of the extracting apparatus C3 in the seventh embodiment at Step 2 where the liquefied butane has been sealed in in the treatment tank 2B.

As Step 2, the liquefied isobutane (extraction solvent) is sealed in in the butane-side cycle (the double solid lines in FIG. 12) including the treatment tank 2B.

The conduit above the treatment tank 2B, and between the treatment tank 2B and the vacuum pump 21b is connected with a cylinder 30 filled with the liquefied butane. That is, the cylinder 30 is attached above the treatment tank 2B.

The exhaust valve 29 is closed. Then, the liquefied butane in the cylinder 30 is sealed in in the treatment tank 2B and the butane-side cycle (illustrated by the double solid lines in FIG. 12). By installing the vacuum pump 21b, the cylinder 30 and the treatment tank 2B on the same side, parts can be shared therebetween, and the number of parts can be reduced. Note that it is also possible to install the vacuum pump 21b and the cylinder 30 below the treatment tank 2B.

Figure 13:
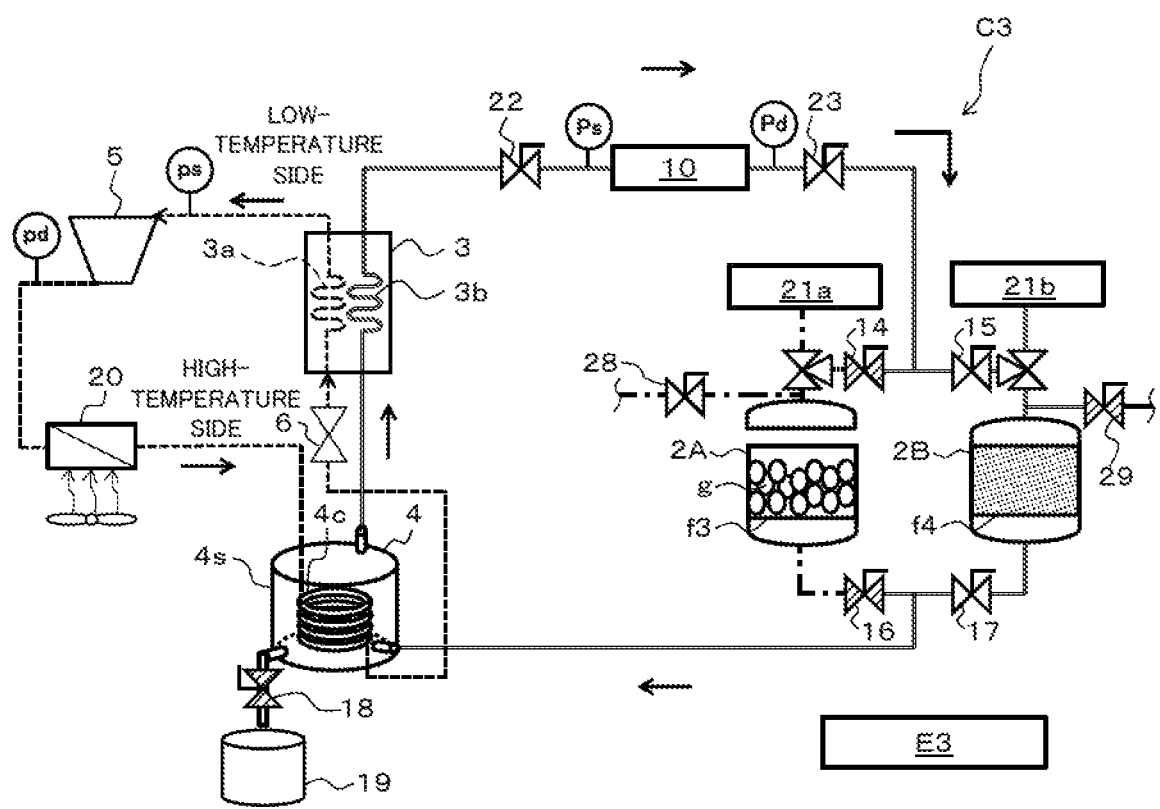
FIG. 13 is a schematic diagram of a state of the extracting apparatus in the seventh embodiment at Step 3 where a raw material has been fed to the treatment tank.

FIG. 13 is a schematic diagram of a state of the extracting apparatus C3 in the seventh embodiment at Step 3 where a raw material has been fed into the treatment tank 2A. The hatching of the treatment tank 2B in FIG. 13 illustrates that the treatment tank 2B is filled with the liquefied isobutane.

At Step 3, the valves 14 and 16 are closed, the exhaust valve 28 is opened, the treatment tank 2A is disconnected from the butane-side cycle (the double solid lines in FIG. 13), and the treatment tank 2B and the butane-side cycle are filled with the liquefied butane. The exhaust valve 29 is closed.

The treatment tank 2A is opened, and the raw material g is fed into the treatment tank 2A.

Thereafter, at Step 4, the vacuum pump 21a is activated in a state in which the exhaust valve 28, and the valves 14 and 16 are closed. The treatment tank 2A into which the raw material has been fed is evacuated by the vacuum pump 21a.

Figure 14:
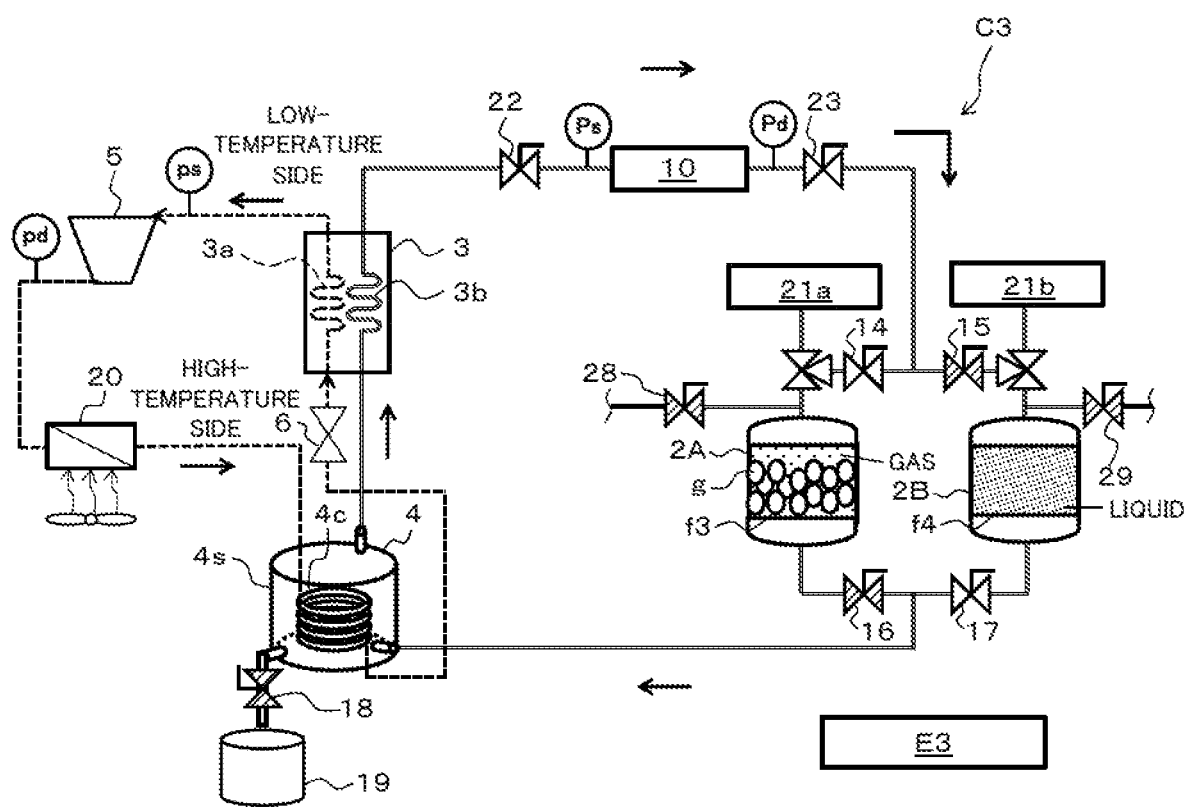
FIG. 14 is a schematic diagram of a state of the extracting apparatus in the seventh embodiment at Step 5-1 where a gasified isobutane has been sealed in in the evacuated treatment tank into which a raw material has been fed.

FIG. 14 is a schematic diagram of a state of the extracting apparatus C3 in the seventh embodiment at Step 5-1 where the gasified butane has been sealed in in the evacuated treatment tank 2A into which the raw material g has been fed.

At Step 5-1, the valve 16 and the exhaust valve 28 are closed, and the valve 14 is opened. Then, the gasified butane from the butane-side cycle (illustrated by the double solid lines in FIG. 14) in which the valves 17, 22 and 23 are opened is sealed in in the evacuated treatment tank 2A into which the raw material g has been fed.

Figure 15:
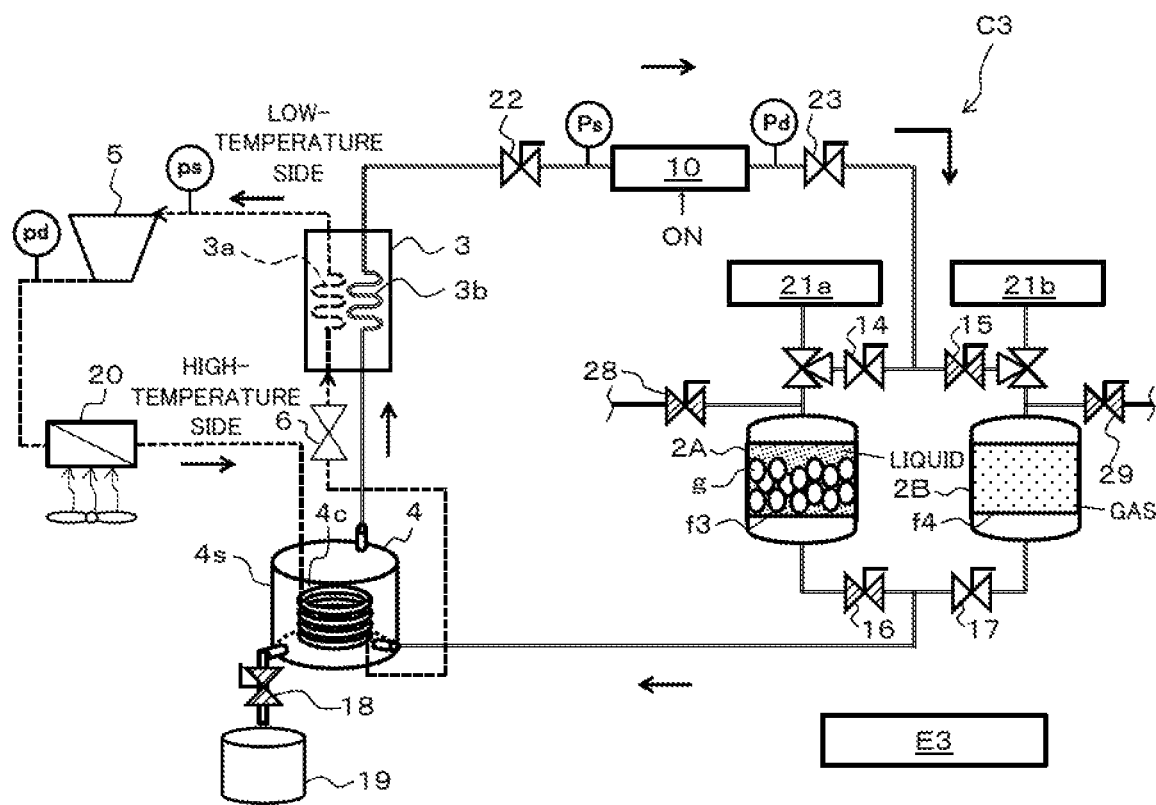
FIG. 15 is a schematic diagram of a state of the extracting apparatus in the seventh embodiment at Step 5-2 where a liquefied isobutane sealed in in the treatment tank has been transferred to the treatment tank.

FIG. 15 is a schematic diagram of a state of the extracting apparatus C3 in the seventh embodiment at Step 5-2 where the liquefied butane sealed in in the treatment tank 2B has been transferred to the treatment tank 2A.

At Step 5-2, the valves 17, 22, 23 and 14 are opened, and the butane-side cycle (illustrated by the double solid lines in FIG. 15) is released from the treatment tank 2B to the treatment tank 2A. Then, the valves 15 and 16, and the exhaust valves 28 and 29 are closed. In this state, the compressor 5 is activated, and the pump 10 is activated. Thereby, the liquefied butane sealed in in the treatment tank 2B exits the treatment tank 2B, is vaporized at the heat exchanger 4, is liquefied in the heat exchanger 3, and turns into a liquefied butane. Then, the liquefied butane is transported to the treatment tank 2A. This operation is continued, and the liquefied butane sealed in in the treatment tank 2B is transferred to the treatment tank 2A. Thereby, the gasified butane remains in the treatment tank 2B.

Figure 16:
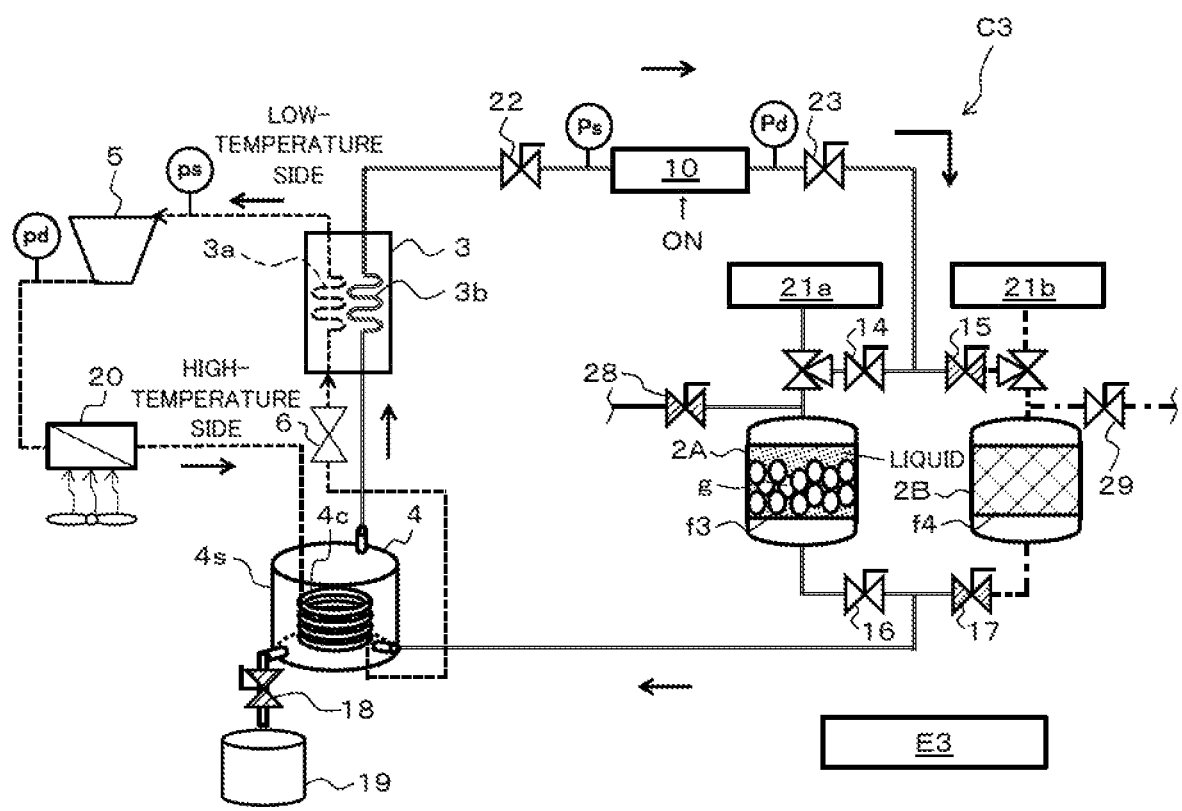
FIG. 16 is a schematic diagram of a state of the extracting apparatus in the seventh embodiment at Step 6-1 where the gasified isobutane in the treatment tank is discharged, and extraction from the raw material in the treatment tank has been started.

FIG. 16 is a schematic diagram of a state of the extracting apparatus C3 in the seventh embodiment at Step 6-1 where the gasified butane remaining in the treatment tank 2B is discharged, and operation of extraction from the raw material in the treatment tank 2A has been started.

At Step 6-1, the valves 15 and 17 that are located upstream and downstream of the treatment tank 2B are closed, the exhaust valve 29 is opened, and the gasified butane in the treatment tank 2B passes through the exhaust valve 29, and is discharged.

The exhaust valve 28 near the treatment tank 2A is closed, and the valves 16, 22, 23 and 14 in the butane-side cycle (illustrated by the double solid lines in FIG. 16) including the treatment tank 2A are opened. In this state, the compressor 5 and the pump 10 are activated. Solid contents in the raw material g and the liquefied butane in the treatment tank 2A are eliminated at the filter f3, and the liquefied butane flows into the shell 4s of the heat exchanger 4. The liquefied butane is vaporized in the shell 4s of the heat exchanger 4, and the extraction target having been dissolved in the liquefied butane remains in the shell 4s of the heat exchanger 4. The vaporized isobutane is liquefied in the second tube 3b of the heat exchanger 3, and is transferred to the treatment tank 2A by the pump 10.

At Step 6-2, the extraction at the treatment tank 2A (a part of the treatment tanks) is continued. On the other hand, the valves 15 and 17, and the exhaust valve 29 that are closer to the treatment tank (another part of the treatment tank) 2B having pressure that has become atmospheric pressure are closed, and the vacuum pump 21b is activated. Thereby, the treatment tank 2B is evacuated.

At Step 6-3, similar to FIG. 16, the extraction in the treatment tank 2A is continued. On the other hand, once the treatment tank 2B is evacuated, the vacuum pump 21b is stopped. Thereafter, the exhaust valve 29 is opened in a state in which the valves 15 and 17 are closed. Atmospheric air enters the treatment tank 2B, and the pressure of the treatment tank 2B becomes atmospheric pressure (illustrated by the cross-hatching in FIG. 16).

Figure 17:
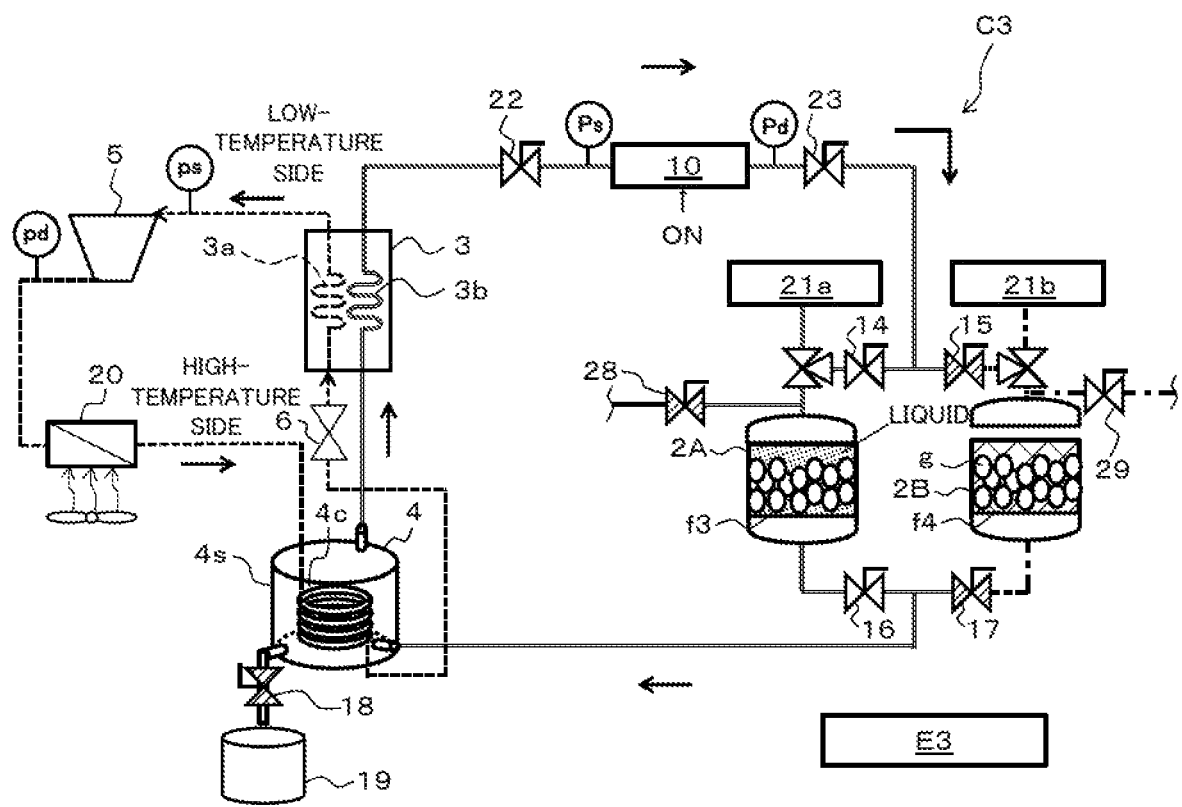
FIG. 17 is a schematic diagram of a state of the extracting apparatus in the seventh embodiment at Step 6-4 where the extraction is being performed in the treatment tank, and a raw material is fed into the treatment tank.

FIG. 17 is a schematic diagram of a state of the extracting apparatus C3 in the seventh embodiment at Step 6-4 where the extraction is being performed in the treatment tank 2A, and a raw material is fed into the treatment tank 2B.

At Step 6-4, the extraction in the treatment tank 2A is continued. On the other hand, the raw material is fed into the treatment tank 2B in a state in which the valves 15 and 17 are closed, and the exhaust valve 29 is opened.

Figure 18:
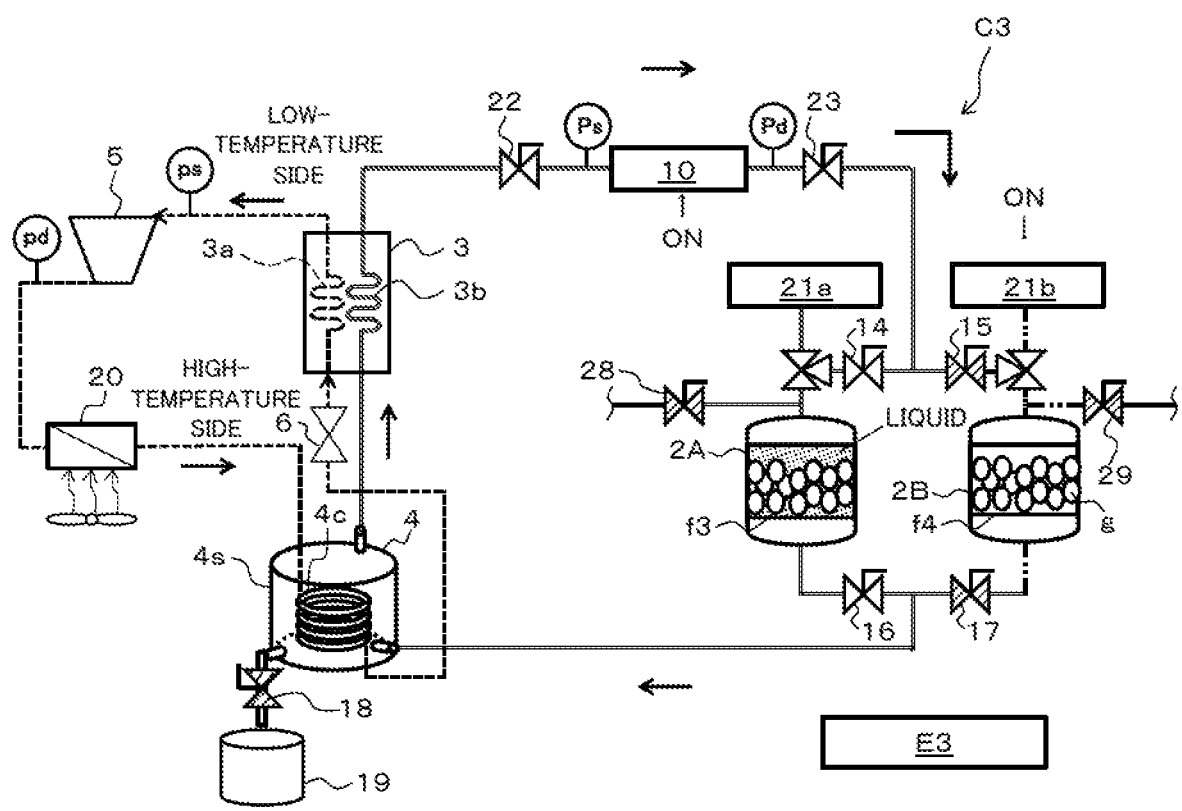
FIG. 18 is a schematic diagram of a state of the extracting apparatus in the seventh embodiment at Step 6-5 where the extraction is being performed in the treatment tank, and a raw material is fed into the treatment tank.

FIG. 18 is a schematic diagram of a state of the extracting apparatus C3 in the seventh embodiment at Step 6-5 where the extraction is being performed in the treatment tank 2A, and a raw material is fed into the treatment tank 2B. The double solid lines in FIG. 18 illustrate that the butane-side cycle is filled with the liquefied isobutane.

At Step 6-5, the extraction in the treatment tank 2A is continued. On the other hand, regarding the treatment tank 2B into which the raw material g has been fed, the vacuum pump 21b is activated in a state in which the valves 15 and 17, and the exhaust valve 29 are closed. The treatment tank 2B is evacuated.

At Step 6-6, the extraction in the treatment tank 2A is completed. In addition, upon completion of evacuation of the treatment tank 2B into which the raw material has been fed, the vacuum pump 21b is stopped.

Figure 19:
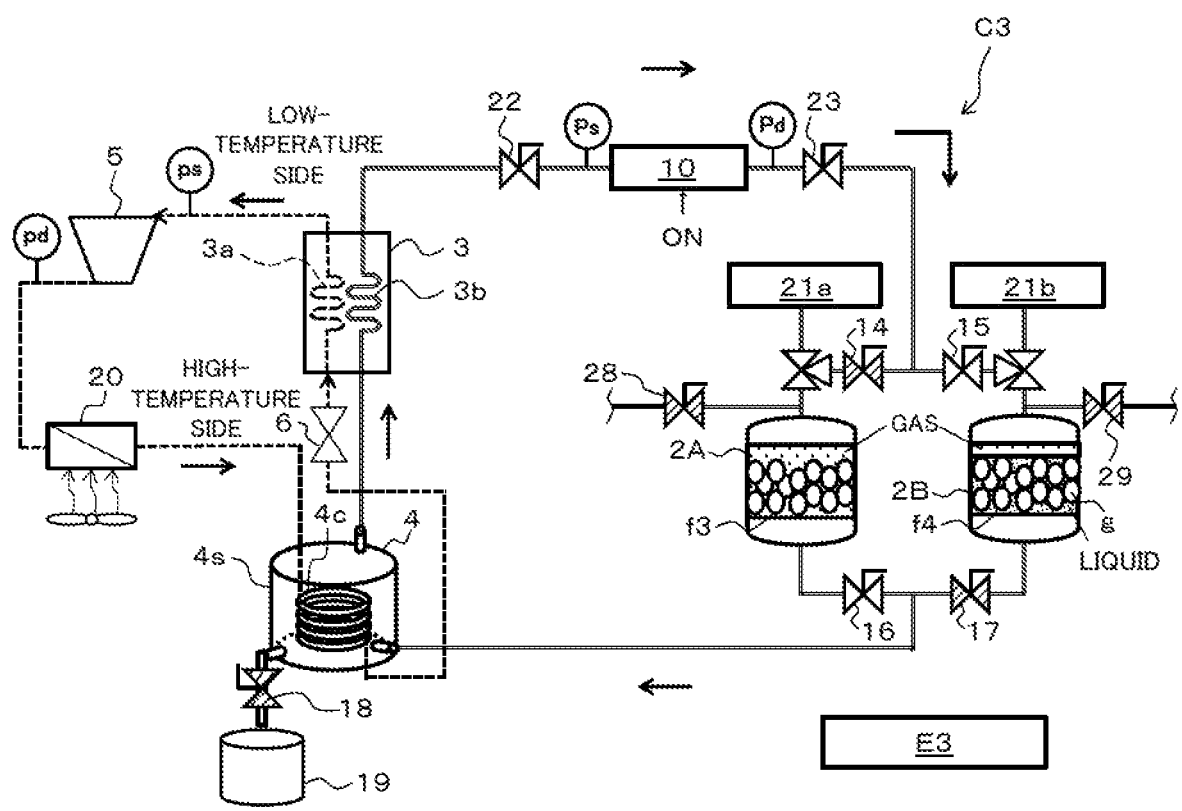
FIG. 19 is a schematic diagram of a state of the extracting apparatus in the seventh embodiment at Step 7 where the liquefied isobutane in the treatment tank is transferred to the treatment tank.

FIG. 19 is a schematic diagram of the state of the extracting apparatus C3 in the seventh embodiment at Step 7 where the liquefied isobutane in the treatment tank 2A is transferred to the treatment tank 2B. The double solid lines in FIG. 19 illustrate that the butane-side cycle is filled with the liquefied isobutane.

At Step 7, the valve 14 and the exhaust valve 28 that are closer to the treatment tank 2A are closed. Then, the valves 16, 22, 23 and 15 are opened, and the exhaust valve 29 is closed. Then, the compressor 5 and the pump 10 are activated. Thereby, the liquefied butane in the treatment tank 2A is vaporized in the heat exchanger 4, and liquefied in the heat exchanger 3. Then, the liquefied butane is transferred to the treatment tank 2B. The gasified butane remains in the treatment tank 2A.

Figure 20:
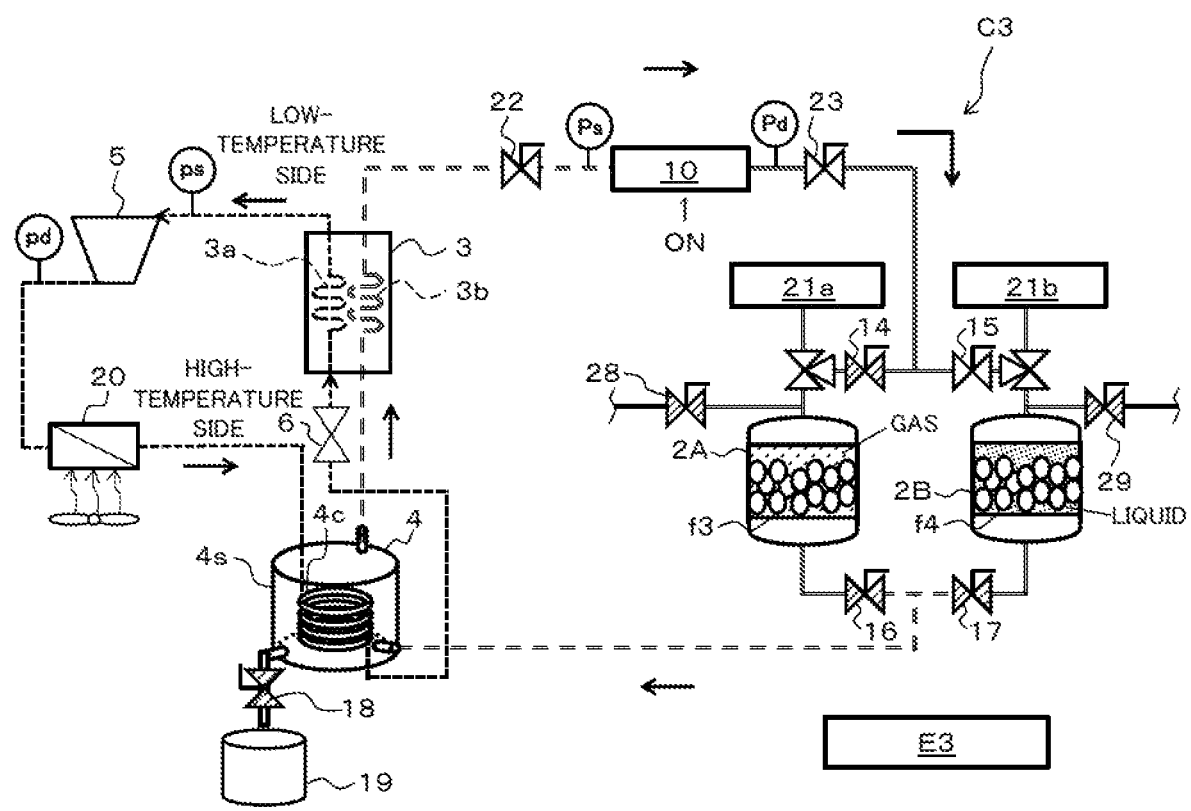
FIG. 20 is a schematic diagram of a state of the extracting apparatus in the seventh embodiment at Step 8 where the liquefied isobutane in heat exchangers is recovered in the treatment tank.

FIG. 20 is a schematic diagram of the state of the extracting apparatus C3 in the seventh embodiment at Step 8 where the liquefied isobutane in the heat exchangers 3 and 4 are recovered in the treatment tank 2B. Note that, in FIG. 20, the double solid lines in the butane-side cycle illustrate the presence of the liquefied isobutane, and the double dashed lines illustrate the presence of the vaporized isobutane.

Step 8 is a liquefied-isobutane recovery process. Step 8 is a process before the extract stored in the heat exchanger 4 is recovered.

At Step 8, the exhaust valves 28 and 29, and the valves 14, 16 and 17 are closed, and the valves 22 and 23 are opened. Then, the compressor 5 and the pump 10 are activated. Thereby, the liquefied isobutane in the heat exchangers 3 and 4 in the butane-side cycle (illustrated by the double solid lines and double dashed lines in FIG. 20) is recovered in the treatment tank 2B. The butane in the butane cycle is at saturated steam pressure. Then, the extract remains in the shell 4s of the heat exchanger 4.

Figure 21:
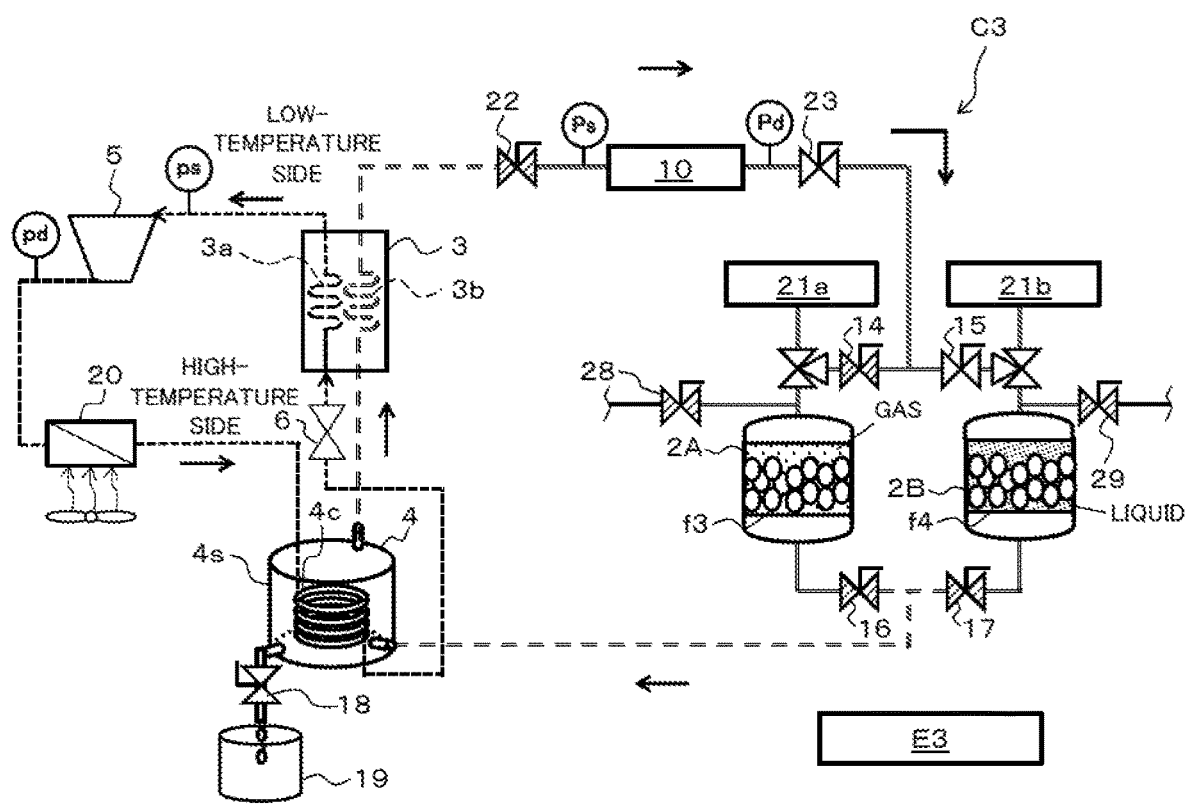
FIG. 21 is a schematic diagram of a state of the extracting apparatus in the seventh embodiment at Step 9 where an extract in the heat exchanger is recovered.

FIG. 21 is a schematic diagram of the state of the extracting apparatus C3 in the seventh embodiment at Step 9 where the extract in the heat exchanger 4 is recovered. Note that, in FIG. 21, the double solid lines in the butane-side cycle illustrate the presence of the liquefied butane, and the double dashed lines illustrate the presence of the vaporized butane.

Step 9 is a step at which the extract in the heat exchanger 4 is recovered.

At Step 9, the valves 14, 16 and 17 are closed, and the valve 15 is opened. Then, the valve 23 located downstream of the pump 10 is opened, and the valve 22 located upstream of the pump 10 is closed. The compressor 5 and the pump 10 are stopped. Then, by releasing the valve 18 connected to the heat exchanger 4, the extract (oil) stored in the shell 4s of the heat exchanger 4 is discharged to the oil reservoir (recovery container) 19 due to the gas pressure in the heat exchanger 4. Thereby, the extract contained in the raw material g, which is the treated material, can be extracted.

Figure 22:
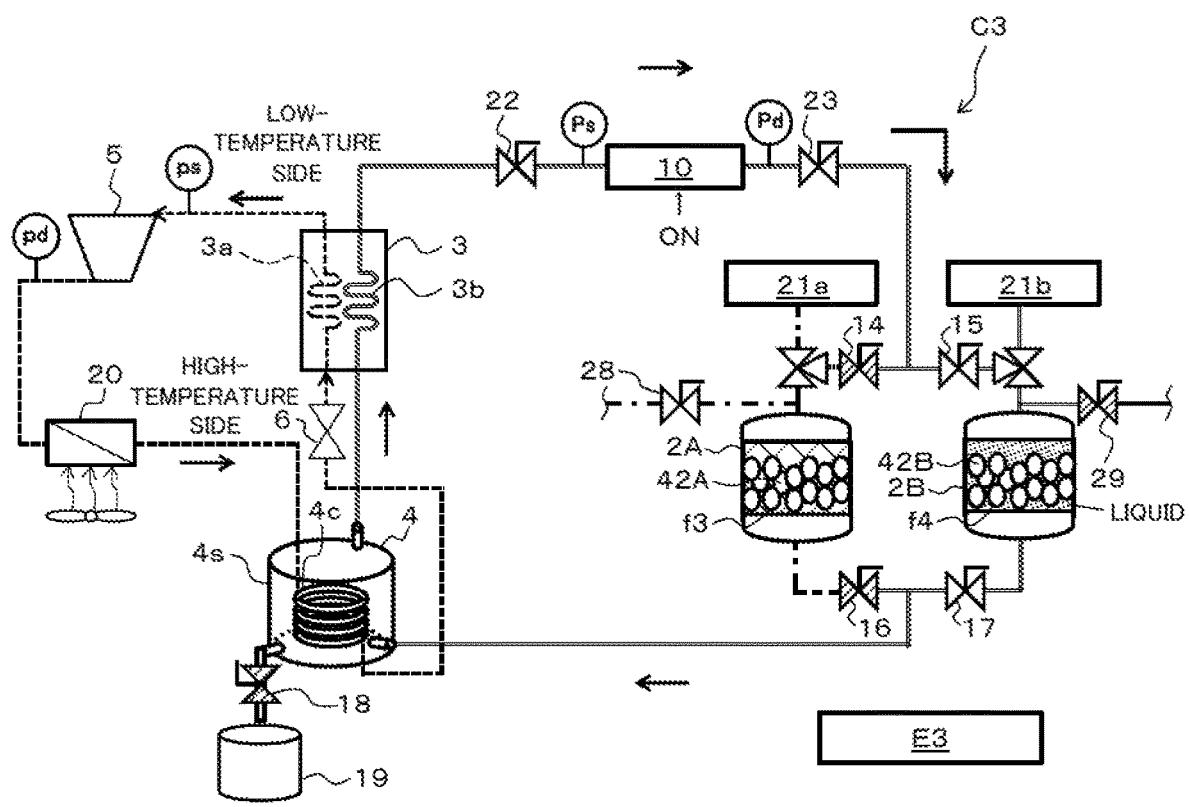
FIG. 22 is a schematic diagram of a state of the extracting apparatus in the seventh embodiment at Step 10-1 where preparation for release of the treatment tank, and extraction in the treatment tank are started.

FIG. 22 is a schematic diagram of the state of the extracting apparatus C3 in the seventh embodiment at Step 10-1 where preparation for release of the treatment tank 2A and extraction in the treatment tank 2B are started. Note that the double solid lines in the butane-side cycle in FIG. 22 illustrate the presence of the liquefied butane.

At Step 10-1, the valves 14 and 16 near the treatment tank 2A are closed, and the exhaust valve 28 is released. Thereby, the vaporized butane that is present in the treatment tank 2A is discharged from the exhaust valve 28. The cross-hatching of the treatment tank 2A in FIG. 22 illustrates that the pressure there is atmospheric pressure.

On the other hand, on the side of the treatment tank 2B, the valves 17, 22, 23 and 15 are opened, the compressor 5 and the pump 10 are activated, and the extraction of the raw material in the treatment tank 2B is started. Solid contents in the liquefied butane containing the raw material in the treatment tank 2B are eliminated at the filter f4, and the liquefied butane is transferred to the shell 4s of the heat exchanger 4. The liquefied butane is vaporized in the shell 4s of the heat exchanger 4, and the extract remains in the shell 4s of the heat exchanger 4. The vaporized butane is liquefied in the second tube 3b of the heat exchanger 3, and transferred to the treatment tank 2B by the pump 10. The dense dots in the treatment tank 2B in FIG. 22 illustrate the presence of the liquefied butane.

At Step 10-2, similar to Step 10-1 in FIG. 22, the extraction in the treatment tank 2B is continued. On the other hand, the valves 14 and 16, and the exhaust valve 28 that are closer to the treatment tank 2A that is at atmospheric pressure are closed, and the vacuum pump 21a is activated. Thereby, the treatment tank 2A is evacuated.

At Step 10-3, similar to Step 10-1 in FIG. 22, the extraction in the treatment tank 2B is continued. On the other hand, once the treatment tank 2A is evacuated, the vacuum pump 21a is stopped. Thereafter, the exhaust valve 28 is opened in a state in which the valves 14 and 16 are closed. The pressure of the treatment tank 2A is made atmospheric pressure.

Figure 23:
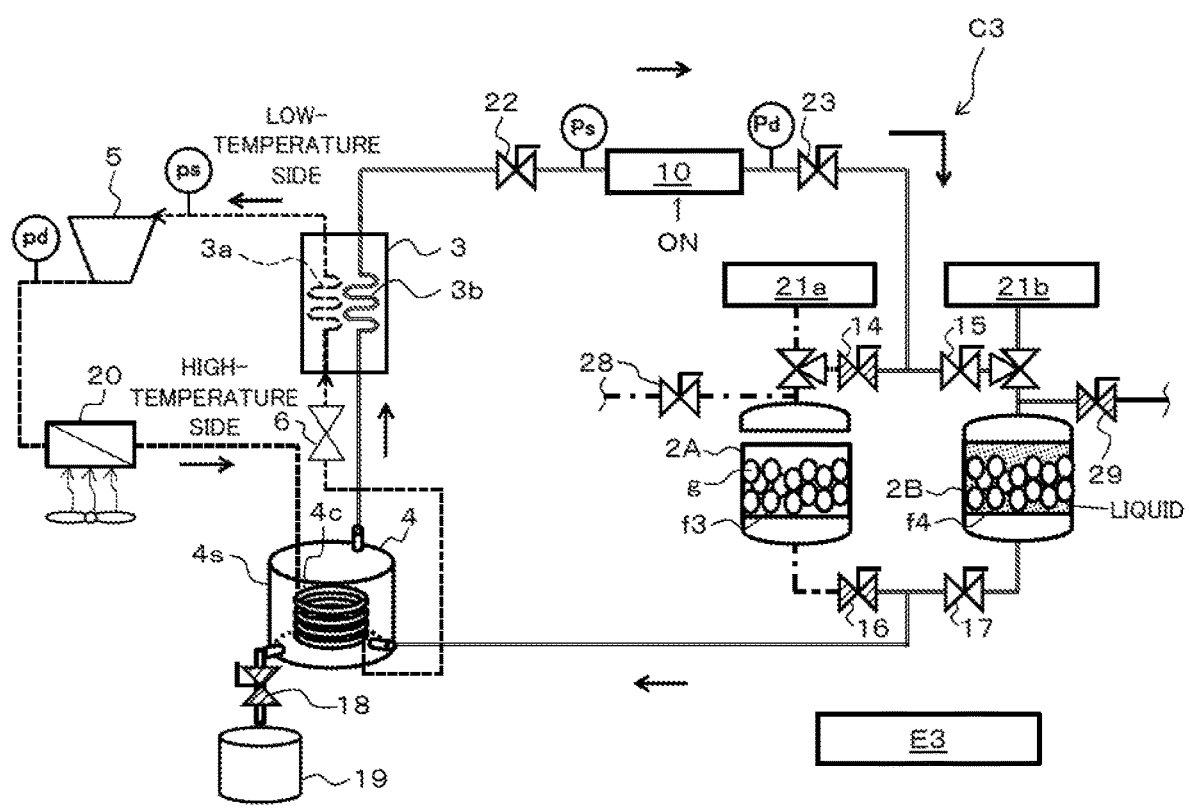
FIG. 23 is a schematic diagram of a state of the extracting apparatus in the seventh embodiment at Step 10-4 where the extraction is being performed in the treatment tank, and the raw material has been replaced with a new raw material in the treatment tank.

FIG. 23 is a schematic diagram of the state of the extracting apparatus C3 in the seventh embodiment at Step 10-4 where the extraction is being performed in the treatment tank 2B, and the raw material has been replaced with a new raw material g in the treatment tank 2A. Note that the double solid lines in the butane-side cycle in FIG. 23 illustrate the presence of the liquefied butane.

At Step 10-4 in FIG. 23, similar to Step 10-1 in FIG. 22, the extraction in the treatment tank 2B is continued. On the other hand, on the side of the treatment tank 2A, the raw material for which the extraction has been completed in the treatment tank 2B is replaced with a raw material (treated material) g for which extraction is to be performed, in a state in which the valves 14 and 16 are closed, and the exhaust valve 28 is opened.

At Step 10-5, similar to Step 10-1 in FIG. 22, the extraction in the treatment tank 2B is continued. On the other hand, regarding the treatment tank 2A into which the raw material g has been fed, the vacuum pump 21a is activated in a state in which the valves 14 and 16, and the exhaust valve 28 are closed. The treatment tank 2A is evacuated.

At Step 10-6, the extraction in the treatment tank 2B is completed in a state that is similar to the state at Step 10-1 in FIG. 22. In addition, upon completion of the evacuation in the treatment tank 2A into which the raw material has been fed, the vacuum pump 21a is stopped in a state in which the valves 14 and 16, and the exhaust valve 28 are closed.

Figure 24:
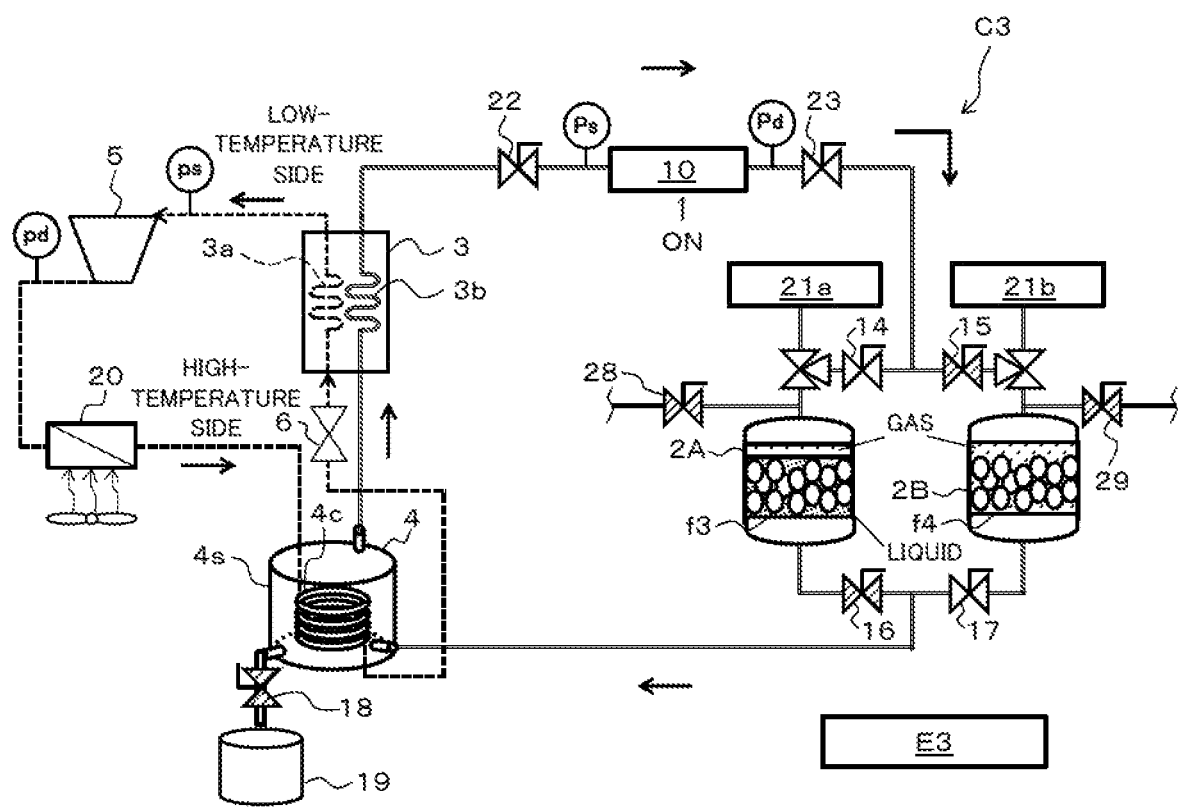
FIG. 24 is a schematic diagram of a state of the extracting apparatus in the seventh embodiment at Step 11 where the liquefied isobutane in the treatment tank is transferred to the treatment tank.

FIG. 24 is a schematic diagram of the state of the extracting apparatus C3 in the seventh embodiment at Step 11 where the liquefied butane in the treatment tank 2B is transferred to the treatment tank 2A. Note that the double solid lines in the butane-side cycle in FIG. 24 illustrate the presence of the liquefied butane.

At Step 11, the valve 15 and the exhaust valve 29 that are closer to the treatment tank 2B are closed. Then, the valves 17, 22, 23 and 14 are opened, and the exhaust valve 28 is closed. Then, the compressor 5 and the pump 10 are activated. Thereby, the liquefied butane in the treatment tank 2B is vaporized in the shell 4s of the heat exchanger 4, and liquefied in the heat exchanger 3. Then, the liquefied butane is transferred to the treatment tank 2A by the pump 10, and recovered. As a result, the liquefied isobutane in the treatment tank 2B is transferred to the treatment tank 2A, and the gasified butane remains in the treatment tank 2B. It is illustrated that the liquefied isobutane is present in the middle to lower section of the treatment tank 2A in FIG. 24, and the gasified butane is present in the upper section of the treatment tank 2A. It is illustrated that the gasified butane is present in the treatment tank 2B.

Figure 25:
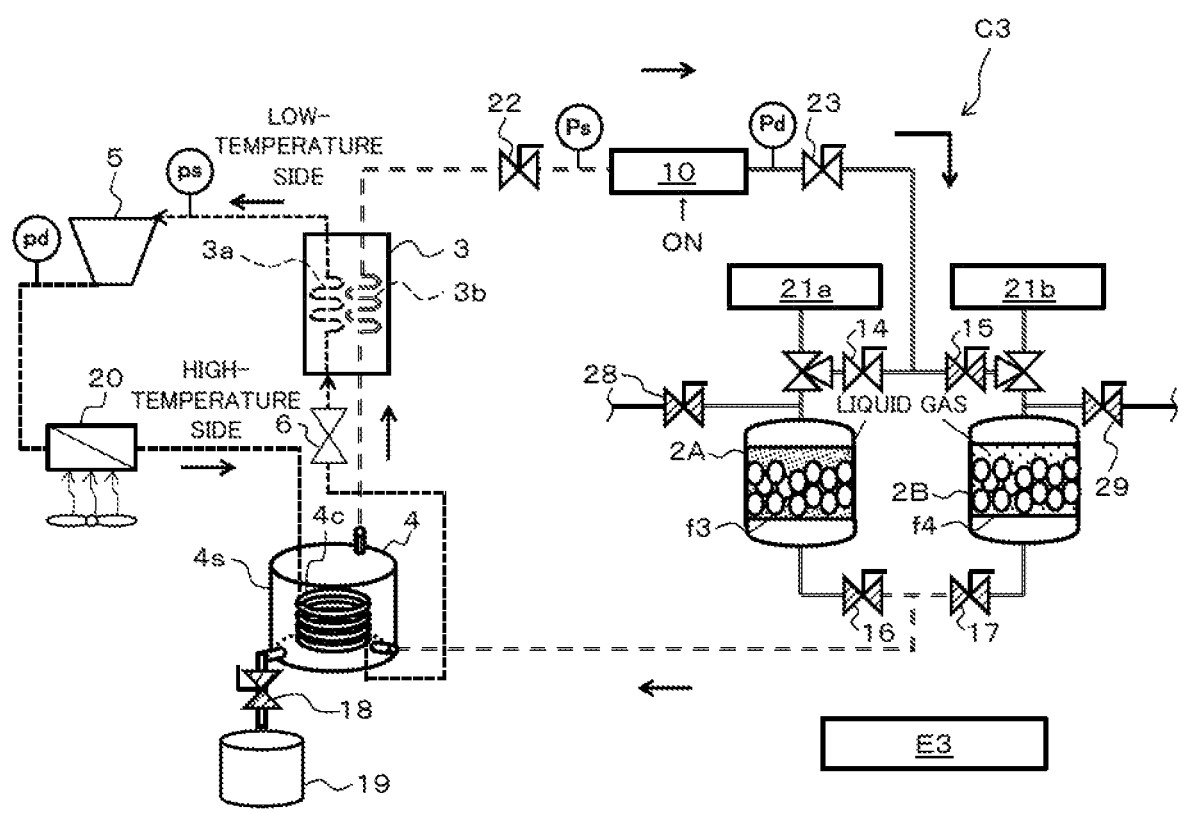
FIG. 25 is a schematic diagram of a state of the extracting apparatus in the seventh embodiment at Step 12 where the liquefied isobutane in the heat exchangers is recovered in the treatment tank.

FIG. 25 is a schematic diagram of the state of the extracting apparatus C3 in the seventh embodiment at Step 12 where the liquefied butane in the heat exchangers 3 and 4 are recovered in the treatment tank 2A.

Step 12 is a liquefied-butane recovery process. Step 12 is a process before the extract stored in the heat exchanger 4 is collected.

At Step 12, the exhaust valves 28 and 29, and the valves 15, 16 and 17 are closed, and the valves 22, 23 and 14 are opened. Then, the compressor 5 and the pump 10 are activated. Thereby, the liquefied butane in the heat exchangers 3 and 4 in the butane-side cycle (illustrated by the double solid lines and double dashed lines in FIG. 25) is recovered in the treatment tank 2A. In FIG. 25, it is illustrated that the liquefied butane is present in the treatment tank 2A, and the vaporized butane is present in the treatment tank 2B.

Then, the extract remains in the shell 4s of the heat exchanger 4.

Figure 26:
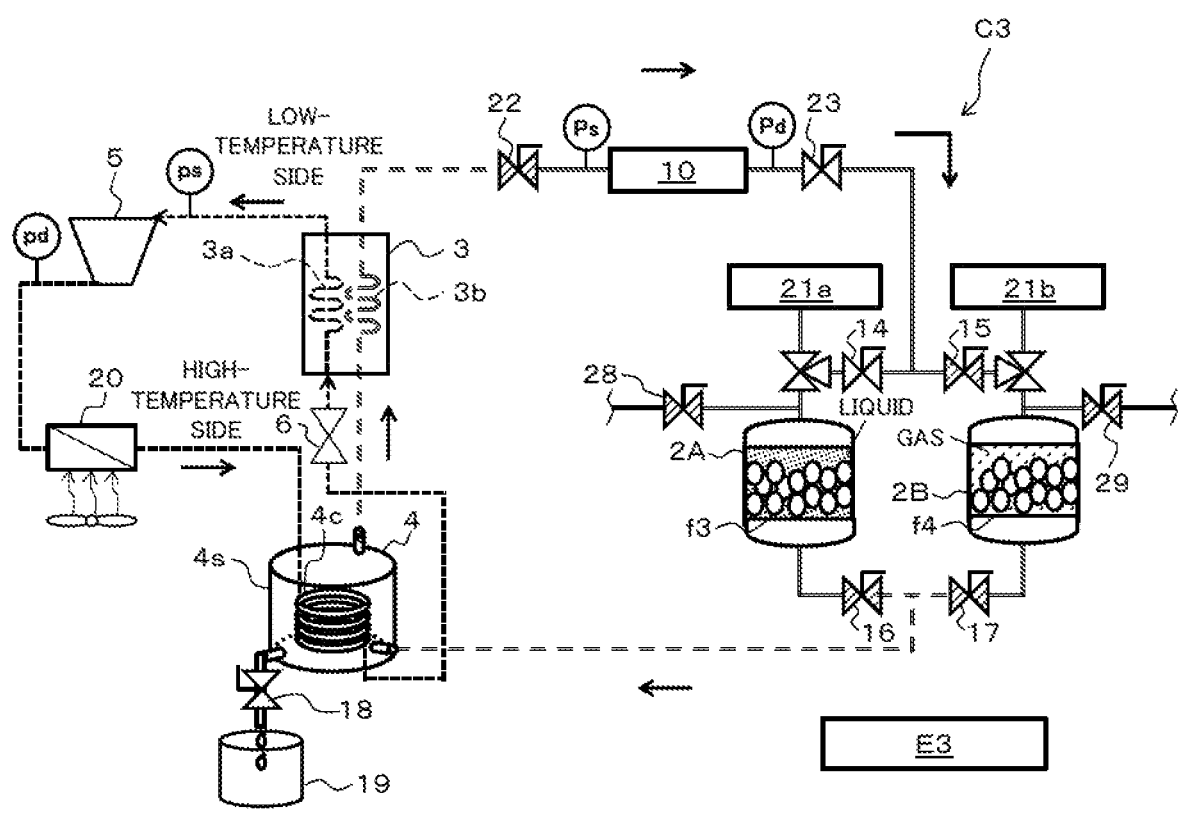
FIG. 26 is a schematic diagram of a state of the extracting apparatus in the seventh embodiment at Step 13 where the extract in the heat exchanger is extracted.

FIG. 26 is a schematic diagram of the state of the extracting apparatus C3 in the seventh embodiment at Step 13 where the extract in the heat exchanger 4 is recovered.

Step 13 is a step at which the extract in the heat exchanger 4 is recovered.

At Step 13, the valves 15, 16 and 17 are closed, and the valve 14 is opened. Then, the valve 23 located downstream of the pump 10 is opened, and the valve 22 located upstream of the pump 10 is closed. The compressor 5 and the pump 10 are stopped. Then, by releasing the valve 18 connected to the heat exchanger 4, the oil, which is the extract, stored in the shell 4s of the heat exchanger 4 is discharged to the oil reservoir (recovery container) 19 due to the gas pressure.

Figure 27:
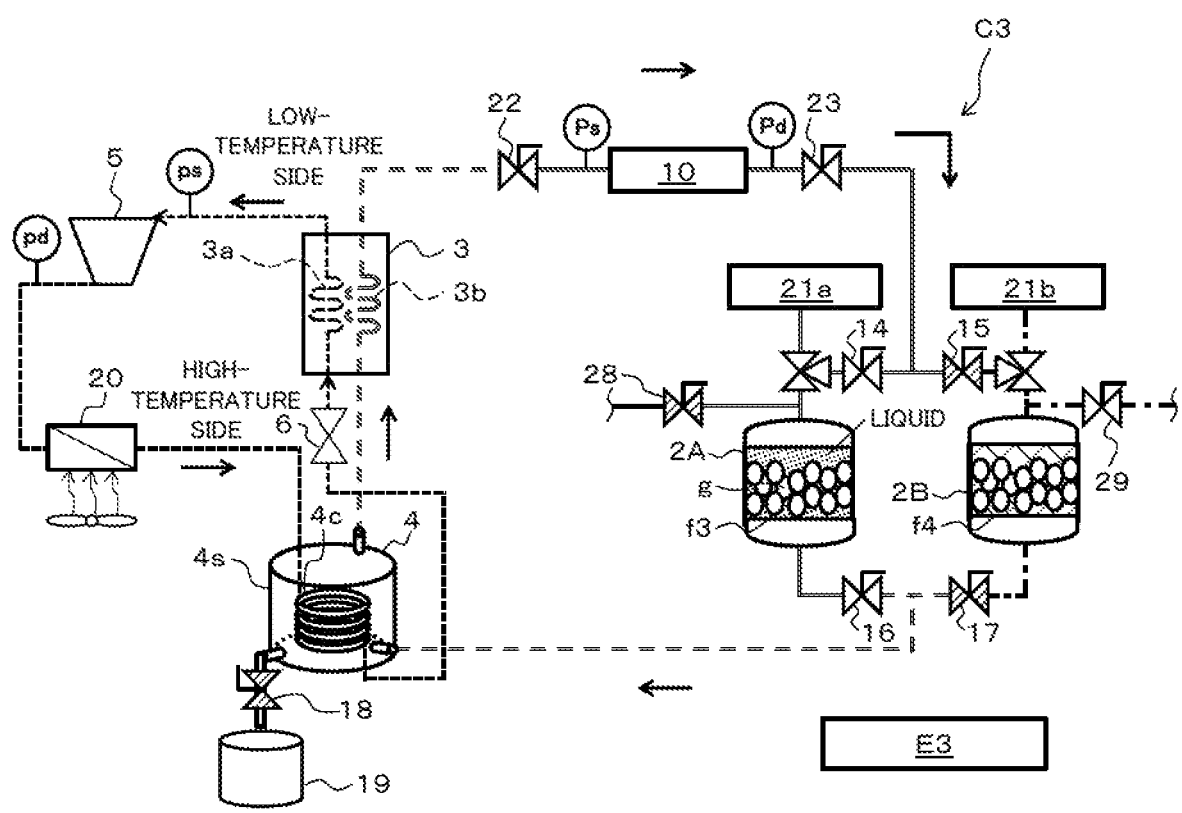
FIG. 27 is a schematic diagram of a state of the extracting apparatus in the seventh embodiment at Step 14-1 where preparation for release of the treatment tank, and extraction in the treatment tank are started.

FIG. 27 is a schematic diagram of the state of the extracting apparatus C3 in the seventh embodiment at Step 14-1 where preparation for release of the treatment tank 2B and extraction of the treatment tank 2A are started. Note that, in FIG. 27, the double solid lines in the butane-side cycle illustrate the presence of the liquefied isobutane, and the double dashed lines illustrate the presence of the vaporized isobutane. It is illustrated in FIG. 27 that the liquefied isobutane is present in the treatment tank 2A, and the treatment tank 2B is at atmospheric pressure.

At Step 14-1, the valves 15 and 17 near the treatment tank 2B are closed, the exhaust valve 29 is released, and the vaporized butane is discharged from the exhaust valve 28.

On the other hand, on the side of the treatment tank 2A, the valves 14, 16, 22 and 23 are opened, the compressor 5 and the pump 10 are activated, and the extraction of the raw material in the treatment tank 2A is started. Solid contents in the liquefied butane containing the raw material in the treatment tank 2A are eliminated at the filter f3, and the liquefied butane is transferred to the heat exchanger 4. The liquefied butane is vaporized in the shell 4s of the heat exchanger 4, and the extract remains in the shell 4s of the heat exchanger 4. The vaporized butane is liquefied in the second tube 3b of the heat exchanger 3, and transferred to the treatment tank 2A by the pump 10.

Figure 28:
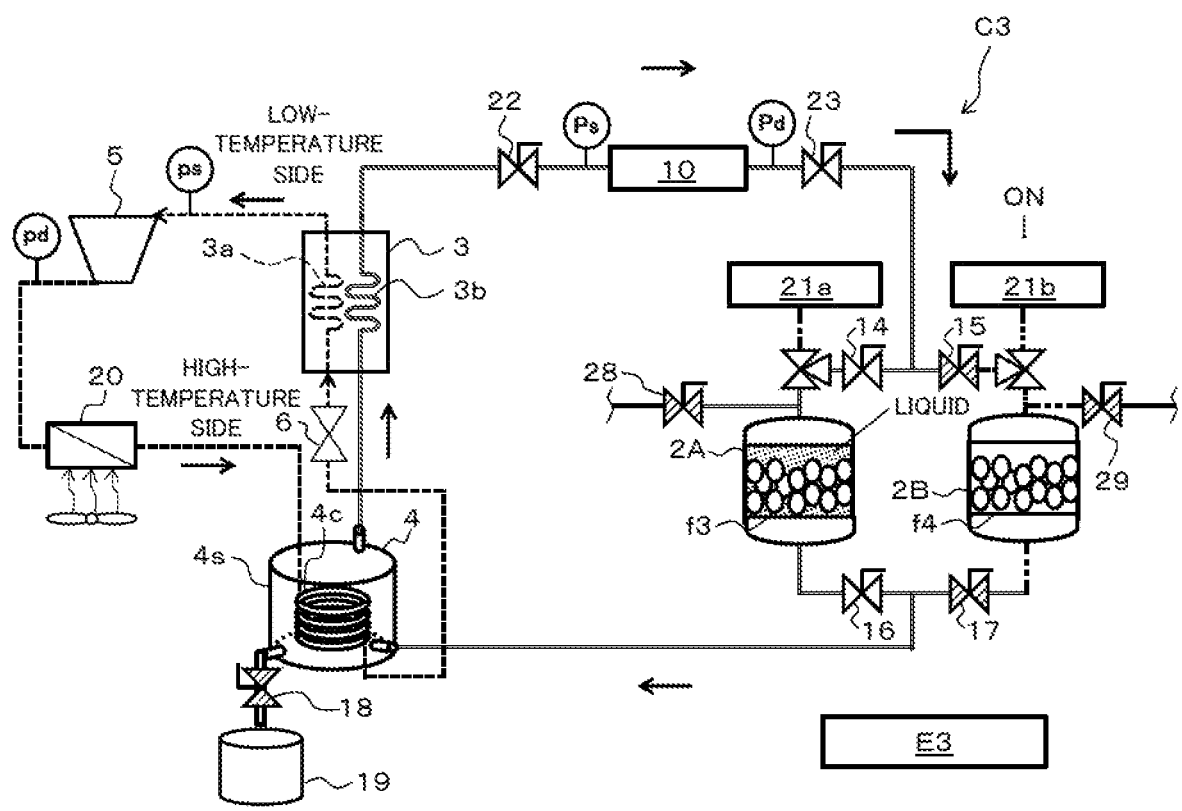
FIG. 28 is a schematic diagram of a state of the extracting apparatus in the seventh embodiment at Step 14-2 where the treatment tank is being evacuated, and the extraction is being performed in the treatment tank.

FIG. 28 is a schematic diagram of the state of the extracting apparatus C3 in the seventh embodiment at Step 14-2 where the treatment tank 2B is being evacuated, and the extraction is being performed in the treatment tank 2A. Note that in FIG. 28, the double solid lines in the butane-side cycle illustrate the presence of the liquefied butane, and the two-dot chain lines illustrate a vacuum.

At Step 14-2, similar to Step 14-1 in FIG. 27, the extraction in the treatment tank 2A is continued. On the other hand, the valves 15 and 17, and the exhaust valve 29 that are closer to the treatment tank 2B that is at atmospheric pressure are closed, and the vacuum pump 21a is activated. Thereby, the treatment tank 2B is evacuated.

At Step 14-3, similar to Step 14-1 in FIG. 27, the extraction in the treatment tank 2A is continued. On the other hand, once the treatment tank 2B is evacuated, the vacuum pump 21b is stopped. Thereafter, the exhaust valve 29 is opened in a state in which the valves 15 and 17 are closed. Atmospheric air enters the treatment tank 2B, and the pressure of the treatment tank 2B becomes atmospheric pressure.

Thereafter, the process returns to the step at which the raw material g is fed to the treatment tank 2B at Step 6-4 (FIG. 17).

A sucking-side pressure gauge Ps is provided upstream of the pump 10 of the extracting apparatus C3, and a discharge-side pressure gauge Pd is provided downstream of the pump 10. Detection signals of the pressure gauges Ps and Pd are input to the controller E3. In addition, control signals for operating the pump 10 are output from the controller E3.

In a case where a detection value of the discharge-side pressure gauge Pd becomes larger than a predetermined value at any point from Steps 1 to 14-3, this means that the loss has increased. Accordingly, the controller E3 performs control such that the rotation speed of the pump 10 is lowered.

According to the configuration described above, it is possible to perform continuous operation in which the extract is extracted from the raw material g, which is the treated material, by performing switching between the treatment tank 2A and the treatment tank 2B.

In addition, the liquefied gas in the treatment tank 2A or the treatment tank 2B can be transferred to the other one of the treatment tank 2B and the treatment tank 2A efficiently.

Additionally, the vaporized gas is released after the liquefied gas is eliminated, thus the external discharge amount of the liquefied gas before the release can be reduced.

As illustrated in FIG. 21 and FIG. 26, the refrigeration cycle is operated in a state in which the valves 16 and 17 located upstream of the heat exchanger 3 and 4 are closed, and the inflows to the heat exchangers 3 and 4 are stopped. Accordingly, after the liquefied gas in the heat exchanger 4 is eliminated completely, the remaining high gas pressure can be used to recover the extract in the oil reservoir (container) 19.

Accordingly, the extract stored in the heat exchanger 4 can be recovered efficiently.

In addition, the controller E3 performs feedback control of the pump 10 by detecting the pressure value by the discharge-side pressure gauge Pd, thus the operation of the pump 10 can be performed efficiently. Accordingly, it is possible to attempt to conserve energy.

Eighth Embodiment

Figure 29:
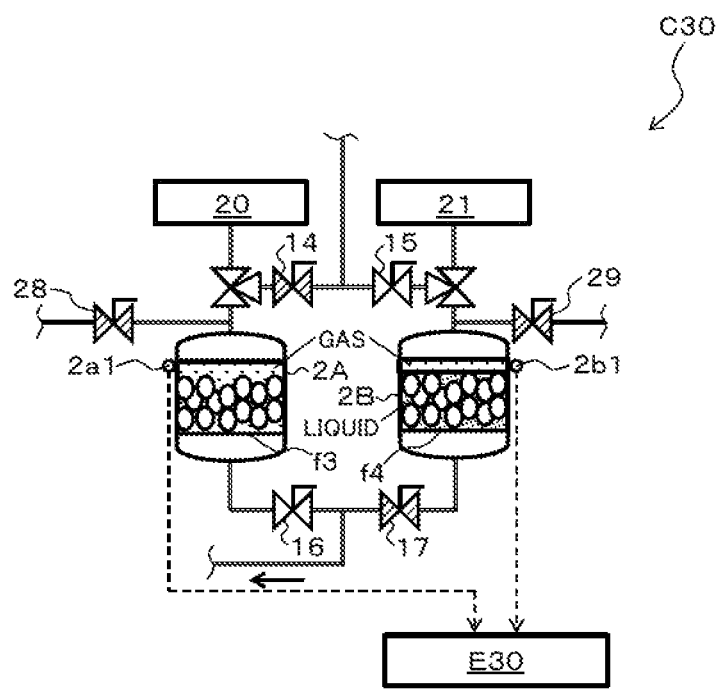
FIG. 29 is a schematic diagram illustrating sections around the treatment tanks at Step 7 in the seventh embodiment in an extracting apparatus in an eighth embodiment.

FIG. 29 is a schematic diagram illustrating sections around the treatment tanks 2A and 2B at Step 7 in the seventh embodiment in an extracting apparatus C30 in an eighth embodiment.

The extracting apparatus C30 in the eighth embodiment relates to a configuration at the time of transferring the liquefied butane in the treatment tank 2A to the treatment tank 2B at Step 7 (FIG. 19), and a configuration at the time of transferring the liquefied butane in the treatment tank 2B to the treatment tank 2A at Step 11 (FIG. 24).

In an eighth embodiment, a controller E30 that controls the extracting apparatus C30 is provided.

In the eighth embodiment, in order to sense that the transfer of the liquefied butane in the treatment tank 2A to the treatment tank 2B at Step 7 has been finished (FIG. 19), a liquid sensor 2a1 that senses the liquid surface of the liquefied butane in the treatment tank 2A is provided.

In addition, in order to sense that the transfer of the liquefied butane in the treatment tank 2B to the treatment tank 2A at Step 11 has been finished (FIG. 24), a liquid sensor 2b1 that senses the liquid surface of the liquefied butane in the treatment tank 2B is provided. The liquid sensors 2a1 and 2b1 are preferably non-contact sensors, for example, optical sensors. Note that the liquid sensors 2a1 and 2b1 used may be liquid sensors other than optical sensors.

Since other configurations are similar to their counterparts in the seventh embodiment, similar constituent elements are indicated by being given identical reference characters, and detailed explanation thereof is omitted.

Input signals of the liquid sensors 2a1 and 2b1 are input to the controller E30.

Since the liquid sensor 2a1 is provided in the treatment tank 2A, the controller E30 can detect and decide that the transfer of the liquefied butane in the treatment tank 2A to the treatment tank 2B at Step 7 has been finished (FIG. 19). In addition, since the liquid sensor 2b1 is provided in the treatment tank 2B, the controller E30 can detect and decide that the transfer of the liquefied butane in the treatment tank 2B to the treatment tank 2A at Step 11 has been finished (FIG. 24).

Ninth Embodiment

Figure 30:
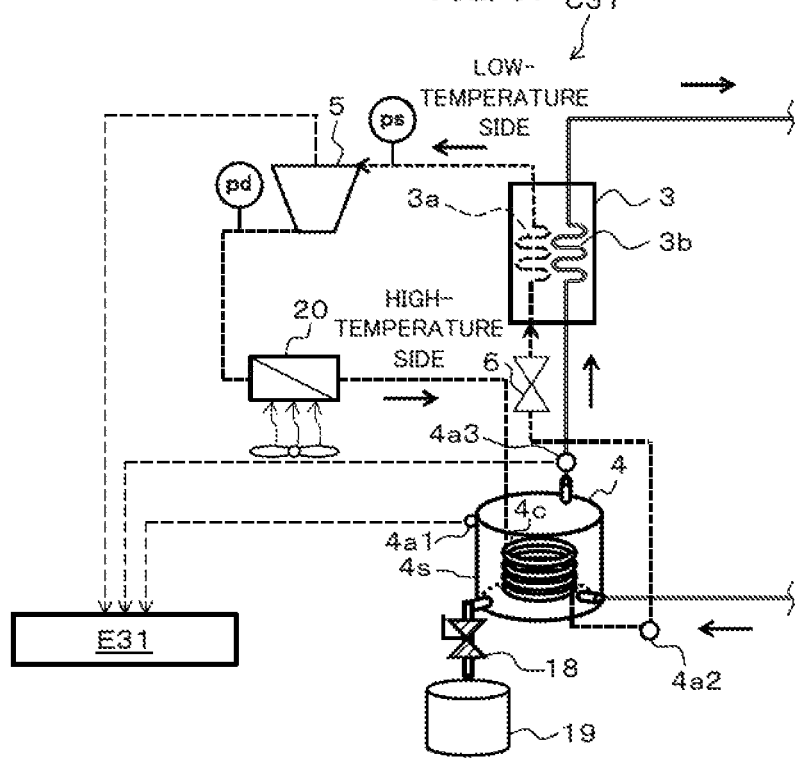
FIG. 30 is a schematic diagram illustrating sections around a compressor and the heat exchanger of an extracting apparatus in a ninth embodiment.

FIG. 30 is a schematic diagram illustrating sections around the compressor 5 and the heat exchanger 4 of an extracting apparatus C31 in a ninth embodiment.

The ninth embodiment relates to a configuration related to feedback control of the compressor 5.

The extracting apparatus C31 in the ninth embodiment is provided with a controller E31 that controls the extracting apparatus C31.

Then, the extracting apparatus C31 is provided with a liquid sensor 4a1 that senses that the liquid level of the liquefied butane and the extract in the heat exchanger 4 has become equal to or lower than the height of the tube 4c.

Then, a temperature sensor 4a2 that detects the outlet temperature of chlorofluorocarbon in the tube 4c of the heat exchanger 4 in the chlorofluorocarbon-side cycle (illustrated by the dashed lines in FIG. 30) is provided downstream of the heat exchanger 4. In addition, a temperature sensor 4a3 for detecting the temperature of the gasified isobutane in the butane-side cycle (illustrated by the double solid lines in FIG. 30) is provided at the outlet for the gasified isobutane in the heat exchanger 4. Since other configurations are similar to their counterparts in the seventh embodiment, similar constituent elements are indicated by being given identical reference characters, and detailed explanation thereof is omitted.

With this configuration, in a case where the liquid sensor 4a1 detects that the liquid level of the liquefied butane and the extract in the heat exchanger 4 has become equal to or lower than the height of the tube 4c, this means that the operation in the chlorofluorocarbon-side cycle is excessive, thus the controller E31 lowers the rotation speed of the compressor 5.

In addition, in a case where the temperature sensor 4a2 detects that the outlet temperature of the chlorofluorocarbon in the heat exchanger 4 has become equal to or higher than a predetermined value, this means that the operation in the chlorofluorocarbon-side cycle is excessive, thus the controller E31 lowers the rotation speed of the compressor 5.

In addition, in a case where the temperature sensor 4a3 detects that the outlet temperature of the gasified isobutane in the heat exchanger 4 has become equal to or higher than a predetermined value, this means that the operation in the chlorofluorocarbon-side cycle is excessive, thus the controller E31 lowers the rotation speed of the compressor 5.

According to the configuration described above, appropriate feedback control of the compressor 5 can be performed in accordance with the operation state of the extracting apparatus C31.

Tenth Embodiment

Figure 31:
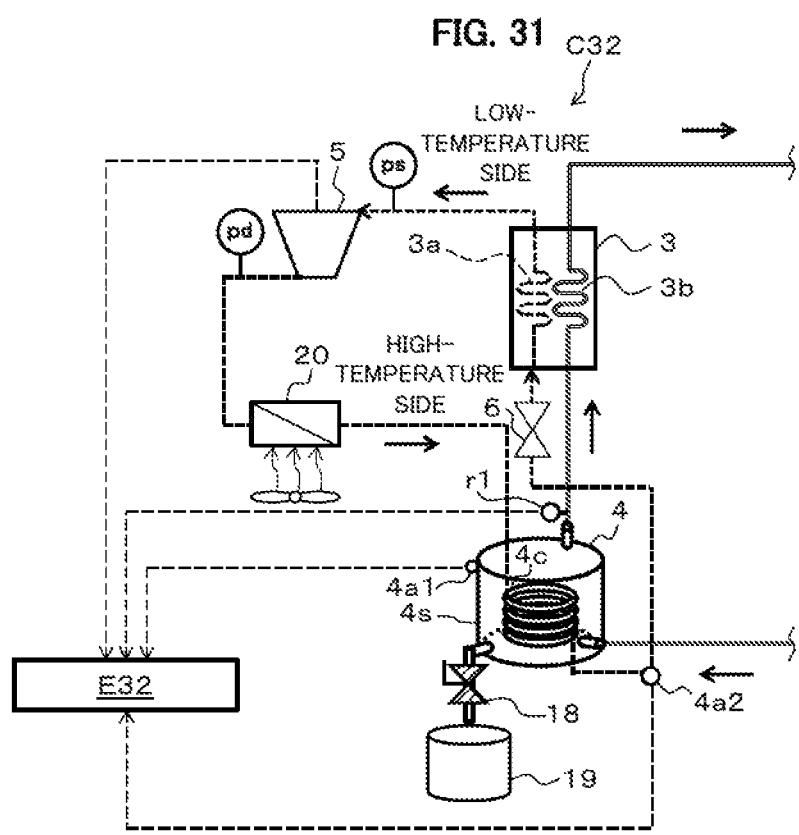
FIG. 31 is a schematic diagram illustrating sections around the compressor and the heat exchanger of an extracting apparatus in a tenth embodiment.

FIG. 31 is a schematic diagram illustrating sections around the compressor 5 and the heat exchanger 4 of an extracting apparatus C32 in a tenth embodiment.

The extracting apparatus C32 in the tenth embodiment relates to a configuration related to control of decisions about the end of the heat exchanger 4 for vaporization at Step (see FIG. 20) and Step 12 (see FIG. 25) in the liquefied-butane recovery process in the seventh embodiment.

In the tenth embodiment, a controller E32 that controls the extracting apparatus C32 is provided.

In the tenth embodiment, the temperature sensor 4a2 that detects the outlet temperature of chlorofluorocarbon in the tube 4c of the heat exchanger 4 in the chlorofluorocarbon-side cycle (illustrated by the dashed lines in FIG. 31) is provided downstream of the heat exchanger 4. Then, the conduit for the gasified isobutane located downstream of the heat exchanger 4 in the butane-side cycle (illustrated by the double solid lines in FIG. 31) is provided with a flow sensor r1. Since other configurations are similar to their counterparts in the seventh embodiment, similar constituent elements are indicated by being given identical reference characters, and detailed explanation thereof is omitted.

A detection signal of the temperature sensor 4a2, and a detection signal of the flow sensor r1 are input to the controller E32. In addition, a control signal of the controller E32 controls the operation of the compressor 5 that activates the heat exchanger 4.

In a case where the outlet temperature of the chlorofluorocarbon in the tube 4c of the heat exchanger 4 detected at the temperature sensor 4a2 is equal to or higher than a predetermined temperature, it is considered that the amount of the gasified butane that is present is small, thus the controller E32 stops the operation of the compressor 5 that activates the heat exchanger 4.

Alternatively, in a case where the flow rate of the gasified butane located downstream of the heat exchanger 4 in the butane-side cycle (illustrated by the double solid lines in FIG. 31) detected at the flow sensor r1 is equal to or lower than a predetermined flow rate, it is considered that the amount of the gasified butane that is present is small, thus the controller E32 stops the operation of the compressor 5 that activates the heat exchanger 4.

According to the configuration described above, excessive operation of the heat exchanger 4 for vaporization can be suppressed, and operation can be performed appropriately.

Eleventh Embodiment

Figure 32:
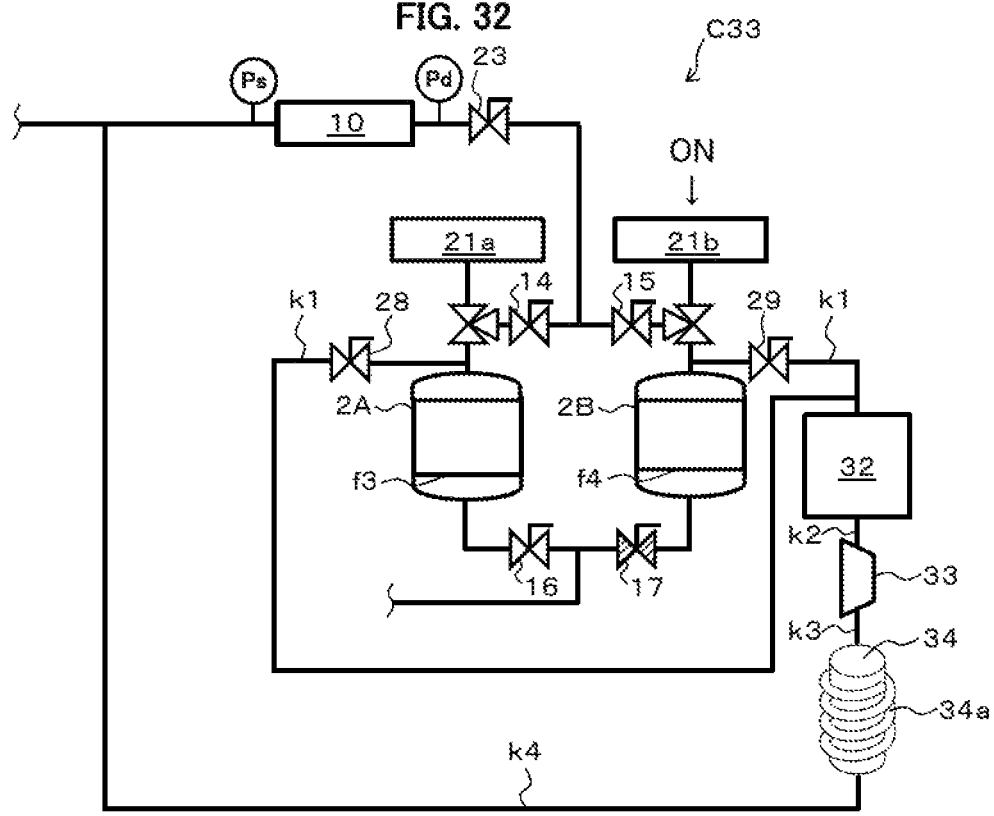
FIG. 32 is a schematic diagram illustrating sections around the treatment tanks of an extracting apparatus in an eleventh embodiment.

FIG. 32 is a schematic diagram illustrating sections around the treatment tanks 2A and 2B of an extracting apparatus C33 in an eleventh embodiment.

The eleventh embodiment relates to a configuration of reusing the gasified butane in the treatment tank 2B at Step 6-1 (see FIG. 16), and the gasified butane in the treatment tank 2A at Step 10-1 (see FIG. 22) in the seventh embodiment.

In the eleventh embodiment, an unillustrated controller E33 that controls the extracting apparatus C33 is provided. The following processes are performed at the controller E33.

In the extracting apparatus C33 in the eleventh embodiment, the exhaust valves 28 and 29 are connected to a storage tank 32 via a conduit k1, and the storage tank 32 is connected to a compressor 33 via a conduit k2. The compressor 33 is connected, via a conduit k3, to a liquid tank 34 around which a water pipe 34a is wound, and the liquid tank 34 is connected to an upstream side of a circulation tank 10 via a conduit k4. A coolant flows through the water pipe 34a.

With this configuration, by opening the exhaust valves 28 and 29 at Step 10-1 and Step 6-1, respectively, the gasified butane is transferred to the storage tank 32 via the exhaust valve 28 or the exhaust valve 29. The gasified butane in the storage tank 32 is compressed by the compressor 33, and is transferred to, and is cooled in the liquid tank 34 around which the water pipe 34a is wound. The gasified butane is condensed by being cooled in the liquid tank 34, and turns into a liquefied butane. The liquefied butane condensed in the liquid tank 34 is transferred to the pump 10 via the conduit k4, and is reused in the butane-side cycle.

Similarly, the vaporized butane in the treatment tank 2B at Step 14-1 (see FIG. 27) is also transferred to the storage tank 32 via the exhaust valve 28 and the vacuum pump outlet, and is reused in the butane-side cycle.

According to the configuration described above, the gasified butane is reused without being disposed, thus it is possible to reduce the running cost. Accordingly, the extracting apparatus C33 with low running cost can be realized.

Although fishes are used as an example of a treated material, and a fish oil is used as an example of an extract in the fifth to eleventh embodiments, the present invention can certainly be applied to treated materials other than fishes, and extracts other than fish oils.

Twelfth Embodiment

Figure 33:
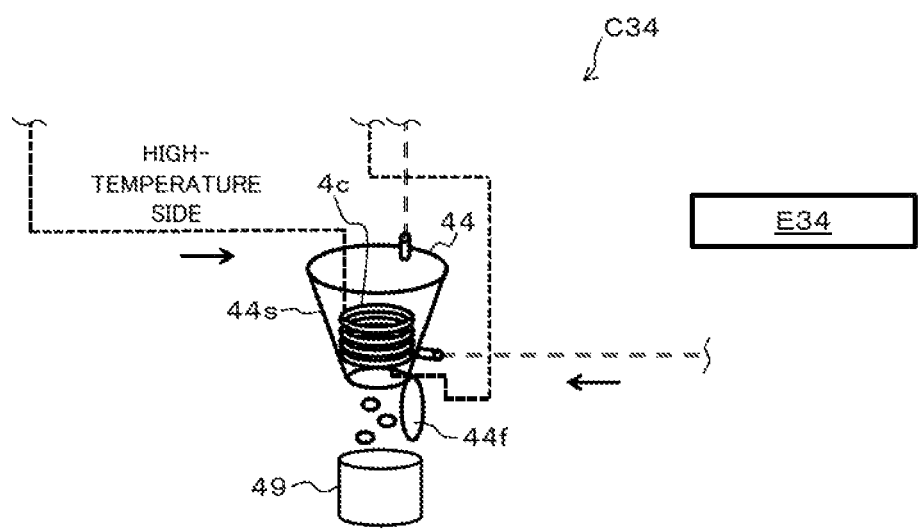
FIG. 33 is a schematic diagram illustrating sections around a heat exchanger of an extracting apparatus in a twelfth embodiment.

FIG. 33 is a schematic diagram illustrating sections around a heat exchanger 44 of an extracting apparatus C34 in a twelfth embodiment.

The extracting apparatus C34 in the twelfth embodiment relates to a case where the treated material is a solid, and the extract is a solid.

In the twelfth embodiment, a controller E34 that controls the extracting apparatus C34 is provided. The following processes are performed at the controller E34.

The extract (solid) contained in the treated-material solid is dissolved in an extraction solvent in treatment tanks 42A and 42B of the twelfth embodiment. Then, solids other than the treated-material extract are eliminated at the filters f3 and f4.

On the other hand, the heat exchanger 44 has a shell 44s with a downwardly tapered shape. The bottom section of the shell 44s is provided with a lower lid 44f that can be opened and closed. Since other configurations are similar to their counterparts in the seventh embodiment, similar constituent elements are indicated by being given identical reference characters, and detailed explanation thereof is omitted.

With the configuration described above, the valves 16 and 17 are closed at Step 9 (see FIG. 21), and Step 13 (see FIG. 26). Then, the valve 22 located upstream of the pump 10 is closed. The compressor 5 and the pump 10 are stopped. Then, the lower lid 44f of the heat exchanger 44 is released, and the extract solid stored in the shell 44s of the heat exchanger 44 is discharged to a container 49 due to gravity.

With this configuration, the solid extract can be extracted from the solid treated material.

As one example, for example, extract salt can be dissolved, and taken out from a treated material which is a mixture of sand and the salt.

Thirteenth Embodiment

Figure 34:
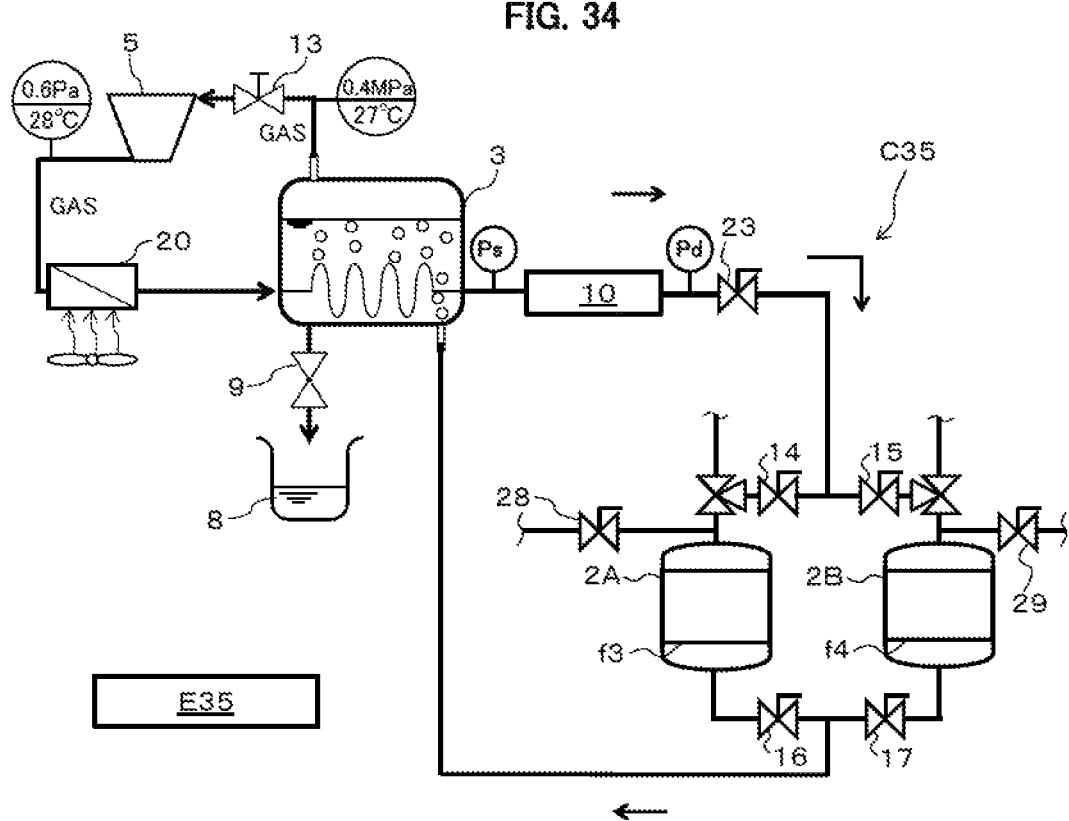
FIG. 34 is a schematic diagram illustrating a configuration of an extracting apparatus in a thirteenth embodiment.

FIG. 34 is a schematic diagram illustrating a configuration of an extracting apparatus C35 in a thirteenth embodiment.

In the extracting apparatus C35 in the thirteenth embodiment, the two treatment tanks 2A and 2B are installed in parallel, instead of the treatment tank 2 in the third embodiment (FIG. 3).

In the thirteenth embodiment, a controller E35 that controls the extracting apparatus C35 is provided.

Similar to the fifth embodiment (see FIG. 5 to FIG. 7), in the extracting apparatus C35, the valve 14 is installed upstream of the treatment tank 2A, and the valve 16 is installed downstream of the treatment tank 2A. In addition, the valve 15 is installed upstream of the treatment tank 2B, and the valve 17 is installed downstream of the treatment tank 2B.

The extracting apparatus C35 is operated by the controller E35 in a similar manner to that of the fifth embodiment.

According to the configuration described above, action and effects similar to those in the fifth embodiment are attained.

Fourteenth Embodiment

Figure 35:
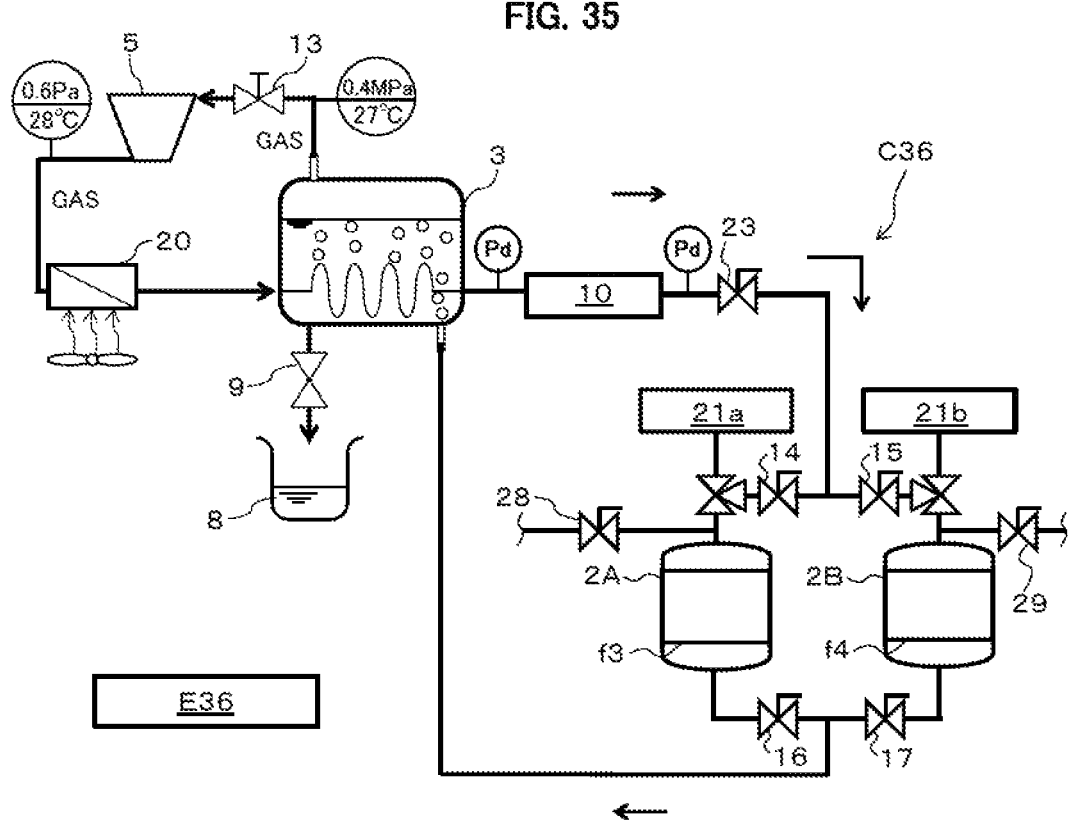
FIG. 35 is a schematic diagram illustrating a configuration of an extracting apparatus in a fourteenth embodiment.

FIG. 35 is a schematic diagram illustrating a configuration of an extracting apparatus C36 in a fourteenth embodiment.

In the extracting apparatus C36 in the fourteenth embodiment, the vacuum pump 21a and the treatment tank 2A, and the vacuum pump 21b and the treatment tank 2B are installed in parallel, instead of the heat exchanger 4 in the fourth embodiment (FIG. 4).

Similar to the sixth embodiment (see FIG. 8), in the extracting apparatus C36, the valve 14 is installed upstream of the vacuum pump 21a and the treatment tank 2A, and the valve 16 is installed downstream of the vacuum pump 21a and the treatment tank 2A. In addition, the valve 15 is installed upstream of the vacuum pump 21b and the treatment tank 2B, and the valve 17 is installed downstream of the vacuum pump 21b and the treatment tank 2B. In the thirteenth embodiment, a controller E36 that controls the extracting apparatus C36 is provided.

The extracting apparatus C36 is operated in a similar manner to those in the sixth and seventh embodiments.

According to the configuration described above, action and effects similar to those in the sixth and seventh embodiments are attained.

Note that the extracting apparatus C36 can be alternatively used in the modification example of the sixth embodiment (see FIG. 9).

In addition, the configurations of the eighth to twelfth embodiments can be applied to the extracting apparatus C36 in the fourteenth embodiment.

Other Embodiments

1. Although in the examples illustrated in the embodiments described above, there is a single treatment tank, the treatment tank 2A or the treatment tank 2B, as a treatment tank in which extraction is being performed, the number of treatment tanks in which extraction is being performed, and the number of treatment tanks in which extraction is not being performed are not limited to one. There may be a single treatment tank in which extraction is being performed, and there may be a plurality of treatment tanks in which extraction is not being performed. There may be a plurality of treatment tanks in which extraction is being performed, and there may be a single treatment tank in which extraction is not being performed. There may be a plurality of treatment tanks in which extraction is being performed, and there may be a plurality of treatment tanks in which extraction is not being performed.

2. Note that although various configurations are explained in the embodiments and modification examples described above, these configurations can be combined as appropriate.

3. There are various possible modification forms and specific forms of the present invention within the scope described in CLAIMS, and the present invention is not limited to the embodiments and modification example that are explained.

REFERENCE SIGNS LIST 2, 2A, 2B: Treatment tank
3: Heat exchanger (first phase transition section, first heat exchanger)
4: Heat exchanger (second phase transition section, second heat exchanger)
4a1: Liquid sensor (liquid sensor)
4a2: Temperature sensor (first temperature sensor)
4a3: Temperature sensor (second temperature sensor)
5: Compressor
6: Expansion valve
7: Storage tank
8: Recovery container
9: Recovery valve
10: Pump
12: Shut-off valve
13: Shut-off valve
14, 15: Valve (second valve)
16, 17: Valve (first valve)
18: Valve (recovery valve)
20: Cooler
21a, 21b: Vacuum pump
28, 29: Discharge valve
30: Cylinder (extraction solvent container)
33: Compressor (reuse compressor)
34: Liquid tank (cooler)
2a1, 2b1: Liquid sensor (end sensor)
C, C1, C2, C3, C21, C22, C30 to C36: Extracting apparatus
E3, E21, E22, E30 to E36: Controller
f3, f4: Filter
Pd: Pressure sensor
r1: Flow sensor

The invention claimed is:

1. An extracting apparatus comprising:
a first heat exchanger configured to cause a phase transition of an extraction solvent from a gas to a liquid;
a second heat exchanger configured to cause a phase transition of the extraction solvent from a liquid to a gas;
a first treatment tank that stores a treated material, and receives an inflow of the extraction solvent that has been liquefied in the first heat exchanger;
a first valve that is provided between the second heat exchanger and the first treatment tank;
a second valve that is provided between the first heat exchanger and the first treatment tank, wherein the second heat exchanger is connected with a recovery valve;
a second treatment tank that is provided in parallel with the first treatment tank;
a third valve that is provided between the second heat exchanger and the second treatment tank; and
a fourth valve that is provided between the first heat exchanger and the second treatment tank, wherein
the first valve and the third valve are provided in parallel,
the second valve and the fourth valve are provided in parallel; and
the first heat exchanger and the second heat exchanger are configured to perform a refrigeration cycle in the extracting apparatus;
a compressor provided on the refrigeration cycle; and
a pump configured to output a liquid-phase of the extraction solvent.

2. The extracting apparatus according to claim 1 wherein the compressor is configured to compress a gas-phase of the extraction solvent.

3. The extracting apparatus according to claim 2 comprising:
a controller that controls the compressor; and
at least one of a liquid sensor that senses a height of a liquid in the second phase transition section heat exchanger, a first temperature sensor that senses an outlet temperature of a refrigerant in the second phase transition section heat exchanger, and a second temperature sensor that senses an outlet temperature of the extraction solvent in the second phase transition section heat exchanger, wherein
in a case where the liquid sensor detects that the height of the liquid is equal to or lower than a predetermined value, the first temperature sensor detects that the outlet temperature of the refrigerant is equal to or higher than a predetermined temperature, or the second temperature sensor detects that the outlet temperature of the extraction solvent is equal to or higher than a predetermined temperature, the controller lowers a rotation speed of the compressor.

4. The extracting apparatus according to claim 2 comprising:
a controller that controls the compressor; and
at least one of a second temperature sensor that detects an outlet temperature of a refrigerant from the second phase transition section heat exchanger, and a flow sensor for the extraction solvent that flows out from the first phase transition section heat exchanger, wherein
in a case where the temperature detected at the second temperature sensor is equal to or higher than a predetermined temperature, or the flow rate detected at the flow sensor is equal to or lower than a predetermined flow rate, the controller stops the compressor.

5. The extracting apparatus according to claim 2 comprising:
a pressure sensor provided downstream of the pump; and
a controller that controls the pump, wherein
in a case where a pressure value detected at the pressure sensor is equal to or higher than a predetermined pressure, the controller lowers a rotation speed of the pump.

6. The extracting apparatus according to claim 1 comprising:
a vacuum pump that is connected between the first valve and the first treatment tank.

7. The extracting apparatus according to claim 1 comprising:
a vacuum pump that is connected between the first valve and the second valve; and
an extraction solvent container for feeding the extraction solvent into the first treatment tank, wherein
the vacuum pump and the extraction solvent container are installed on a same side relative to the first treatment tank.

8. The extracting apparatus according to claim 1 comprising:
an end sensor that detects an end of a transfer of the extraction solvent that is in a part of the first treatment tank after extraction of an extract that is in the part of the first treatment tank to another part of the first treatment tank.

9. An extracting apparatus comprising:
a first heat exchanger configured to cause a phase transition of an extraction solvent from a gas to a liquid;
a second heat exchanger configured to cause a phase transition of the extraction solvent from a liquid to a gas;
a treatment tank that stores a treated material, and receives an inflow of the extraction solvent that has been liquefied in the first heat exchanger;
a first valve that is provided between the second heat exchanger and the treatment tank;
a second valve that is provided between the first heat exchanger and the treatment tank;
wherein the second heat exchanger is connected with a recovery valve;
a discharge valve that discharges a gasified extraction solvent in the treatment tank;
a reuse compressor that is provided being connected to the discharge valve; and
a cooler that is provided being connected to the reuse compressor, and is connected to an upstream side of the treatment tank, wherein
the gasified extraction solvent is liquefied by passing through the reuse compressor and the cooler.

10. An extract manufacturing method that uses a phase-transition cycle of butane, the extract manufacturing method comprising:
an extraction step of extracting an extract from a treated material contained in a first treatment tank;
a containing step of, during the extraction step, providing a treated material contained in a second treatment tank in parallel with the first treatment tank;
a transfer step of, after the extraction step, transferring a liquefied butane in the first treatment tank to the second treatment tank; and
before a recovery step of recovering the extract, a condensation step of closing a valve upstream of the first treatment tank, opening a valve located upstream of the second treatment tank, and driving a compressor in a refrigeration cycle of the butane.

* * * * *